(12) United States Patent
Hurst et al.

(10) Patent No.: US 10,979,473 B2
(45) Date of Patent: *Apr. 13, 2021

(54) APPARATUS, SYSTEM, AND METHOD FOR MULTI-BITRATE CONTENT STREAMING

(71) Applicant: DISH Technologies L.L.C., Englewood, CO (US)

(72) Inventors: Mark B. Hurst, Cedar Hills, UT (US); David F. Bruek, Saratoga Springs, UT (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,748

(22) Filed: Oct. 10, 2018

(65) Prior Publication Data

US 2019/0082000 A1 Mar. 14, 2019

Related U.S. Application Data

(63) Continuation of application No. 15/679,079, filed on Aug. 16, 2017, now Pat. No. 10,165,034, which is a (Continued)

(51) Int. Cl.
| | |
|---|---|
| *H04L 29/06* | (2006.01) |
| *H04N 21/2343* | (2011.01) |
| *H04N 21/2662* | (2011.01) |
| *H04N 21/433* | (2011.01) |
| *H04N 21/647* | (2011.01) |
| *H04N 21/84* | (2011.01) |
| *H04N 21/845* | (2011.01) |
| *H04N 21/454* | (2011.01) |
| *H04N 21/45* | (2011.01) |

(52) U.S. Cl.
CPC ..... *H04L 65/607* (2013.01); *H04N 21/23439* (2013.01); *H04N 21/2662* (2013.01); *H04N 21/4331* (2013.01); *H04N 21/64769* (2013.01); *H04N 21/84* (2013.01); *H04N 21/8456* (2013.01); *H04N 21/454* (2013.01); *H04N 21/4532* (2013.01)

(58) Field of Classification Search
CPC ..... H04L 9/06; H04L 9/00; H04L 9/30; H04L 9/18; G06F 7/725
USPC ....................................................... 380/212
See application file for complete search history.

(56) References Cited

U.S. PATENT DOCUMENTS

| | | |
|---|---|---|
| 7,925,781 B1 | 4/2011 | Chan et al. |
| 8,549,150 B1 | 10/2013 | Roseman et al. |

(Continued)

*Primary Examiner* — Evans Desrosiers
(74) *Attorney, Agent, or Firm* — Lorenz & Kopf LLP

(57) ABSTRACT

An apparatus, system, and method for maintaining a programming lineup of adaptive-bitrate content streaming is provided. The apparatus includes a timeline module configured to maintain a programming lineup of media content available over a network. The media content may comprise a plurality of streamlets. The apparatus also includes at least one data module configured to maintain multi-bitrate streamlet information. The system includes the apparatus and a client module configured to acquire content based upon the programming lineup provided by the timeline module. The method includes maintaining a programming lineup of media content available over a network, and maintaining multi-bitrate streamlet information.

20 Claims, 15 Drawing Sheets

Related U.S. Application Data continuation of application No. 14/222,245, filed on Mar. 21, 2014, now Pat. No. 10,116,722, which is a continuation of application No. 11/834,548, filed on Aug. 6, 2007, now Pat. No. 8,683,066.

(56) References Cited

U.S. PATENT DOCUMENTS

| | | | |
|---|---|---|---|
| 2004/0261091 A1* | 12/2004 | Cherkasova | H04L 29/06027 725/9 |
| 2005/0262257 A1* | 11/2005 | Major | H04N 21/64769 709/231 |
| 2008/0205389 A1 | 8/2008 | Fang et al. | |

* cited by examiner

APPARATUS, SYSTEM, AND METHOD FOR MULTI-BITRATE CONTENT STREAMING

CROSS-REFERENCE TO RELATION APPLICATIONS

This application is a continuation of U.S. patent application Ser. No. 15/679,079 filed on Aug. 16, 2017, which is a continuation of U.S. patent application Ser. No. 14/222,245 filed on Mar. 21, 2014, which is a continuation of U.S. patent application Ser. No. 11/834,548 filed on Aug. 6, 2007 (U.S. Pat. No. 8,683,066), whereby all of the above applications are incorporated herein by reference in their entirety.

BACKGROUND OF THE INVENTION

Field of the Invention

The invention relates to video streaming over packet switched networks such as the Internet, and more particularly relates to maintaining a programming lineup of adaptive-rate shifting of streaming content over such networks.

Description of the Related Art

The Internet is fast becoming a preferred method for distributing media files, to end users. It is currently possible to download music or video to computers, cell phones, or practically any network capable device. Many portable media players are equipped with network connections and enabled to play music or videos. The music or video files (hereinafter "media files") can be stored locally on the media player or computer, or streamed or downloaded from a server.

"Streaming media" refers to technology that delivers content at a rate sufficient for presenting the media to a user in real time as the data is received. The data may be stored in memory temporarily until played and then subsequently deleted. The user has the immediate satisfaction of viewing the requested content without waiting for the media file to completely download. Unfortunately, the audio/video quality that can be received for real time presentation is constrained by the available bandwidth of the user's network connection. Streaming may be used to deliver content on demand (previously recorded) or from live broadcasts.

Alternatively, media files may be downloaded and stored on persistent storage devices, such as hard drives or optical storage, for later presentation. Downloading complete media files can take large amounts of time depending on the network connection. Once downloaded, however, the content can be viewed repeatedly anytime or anywhere. Media files prepared for downloading, and storing usually are encoded with a higher quality audio/video that can be delivered in real time. Users often dislike this option, as they tend to want to see or hear the media file instantaneously.

Streaming offers the advantage of immediate access to the content but currently sacrifices quality compared with downloading a file of the same content. Streaming also provides the opportunity for a user to select different content for viewing on an ad hoc basis, while downloading and storing is restricted to receiving a specific content file in its entirety or not at all. Once an entire file is downloaded, a user may rewind, and fast forward. Conversely, streaming is unable to fully support these functions. Streaming is also vulnerable to network failures or congestion.

Another technology, known as "progressive downloads," attempts to combine the strengths of the above two technologies. When a progressive download is initiated, the media file download begins, and the media player waits to begin playback until there is enough of the file downloaded that playback can begin with the hope that the remainder of the file will be completely downloaded before playback "catches up." This waiting period before playback can be substantial depending on network conditions, and therefore is not a complete or fully acceptable solution to the problem of media presentation over a network.

Generally, three basic challenges exist with regard to data transport streaming over a network such as the Internet that has a varying amount of data loss. The first challenge is reliability. Most streaming solutions use a TCP connection, or "virtual circuit," for transmitting data. A TCP connection provides a guaranteed delivery mechanism so that data sent from one endpoint will be delivered to the destination, even if portions are lost and retransmitted. A break in the continuity of a TCP connection can have serious consequences when the data must be delivered in real-time. When a network adapter detects delays or losses in a TCP connection, the adapter "backs off" from transmission attempts for a moment and then slowly resumes the original transmission pace. This behavior is an attempt to alleviate the perceived congestion. Such a slowdown is detrimental to the viewing or listening experience of the user and therefore is not acceptable.

The second challenge to data transport is efficiency. Efficiency refers to how well the users available bandwidth is used for delivery of the content stream. This measure is directly related to the reliability of the TCP connection. When the TCP connection is suffering reliability problems, a loss of bandwidth utilization results. The measure of efficiency sometimes varies suddenly, and can greatly impact the viewing experience.

The third challenge is latency. Latency is the time measure form the client's point-of-view, of the interval between when a request is issued and the response data begins to arrive. This value is affected by the network connection's reliability and efficiency, and the processing time required by the origin to prepare the response. A busy or overloaded server, for example, will take more time to process a request addition to affecting the start time of a particular request, latency also has a significant impact on the network throughput of TCP.

From the foregoing discussion, it should be apparent that a need exists for an apparatus, system, and method that alleviate the problems of reliability, efficiency, and latency. Additionally, such an apparatus, system, and method would offer instantaneous viewing along with the ability to fast forward, rewind, direct seek, and browse multiple streams. Beneficially, such an apparatus, system, and method would utilize multiple connections between a source and destination, requesting varying bitrate streams depending upon network conditions.

SUMMARY OF THE INVENTION

The present invention has been developed in response to the present state of the art, and in particular, in response to the problems and needs in the art that have not yet been fully solved by currently available content streaming systems. Accordingly, the present invention has been developed to provide an apparatus, system, and method for adaptive-rate content streaming that overcome many or all of the above-discussed shortcomings in the art.

The apparatus for adaptive-rate content streaming is provided with a logic unit containing a plurality of modules configured to functionally execute the necessary steps. These modules in the described embodiments include, a timeline module configured to maintain a programming lineup of media content available over a network, wherein the media content comprises a plurality of streamlets, and at least one data module configured to maintain multi-bitrate streamlet information.

In one embodiment, each streamlet comprises a portion of the media content encapsulated as an independent media object, and each streamlet comprises a predetermined duration of time. Multi-bitrate streamlet information may be selected from the group, comprising of start time, end time, live video, publisher data, encryption, duration, bitrate values, frame size, channels, codecs, sample rate, and frames parser.

In a further embodiment, the apparatus includes a client module configured to skip content in response to a rating system, and skip video that does not conform to a selected rating level. Alternatively, the client module is configured to mute the audio of streamlets that do not conform to a selected rating level. The apparatus also includes a content management system configured to dynamically replace content within media content.

A system of the present invention is also presented for multi-bitrate content streaming. The system, in one embodiment, comprises the apparatus and a client module configured to acquire content based upon the programming lineup provided by the timeline module.

A method of the present invention is also presented for multi-bitrate content streaming. The method, in one embodiment, includes maintaining a programming lineup of media content available over a network, wherein the media content comprises a plurality of streamlets, and maintaining multi-bitrate streamlet information. The method also includes skipping content in response to a rating system, and skipping portions of streamlets that do not conform to a selected rating level. In a further embodiment, the method includes muting the audio of streamlets that do not conform to a selected rating level, and dynamically replacing content within media content.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
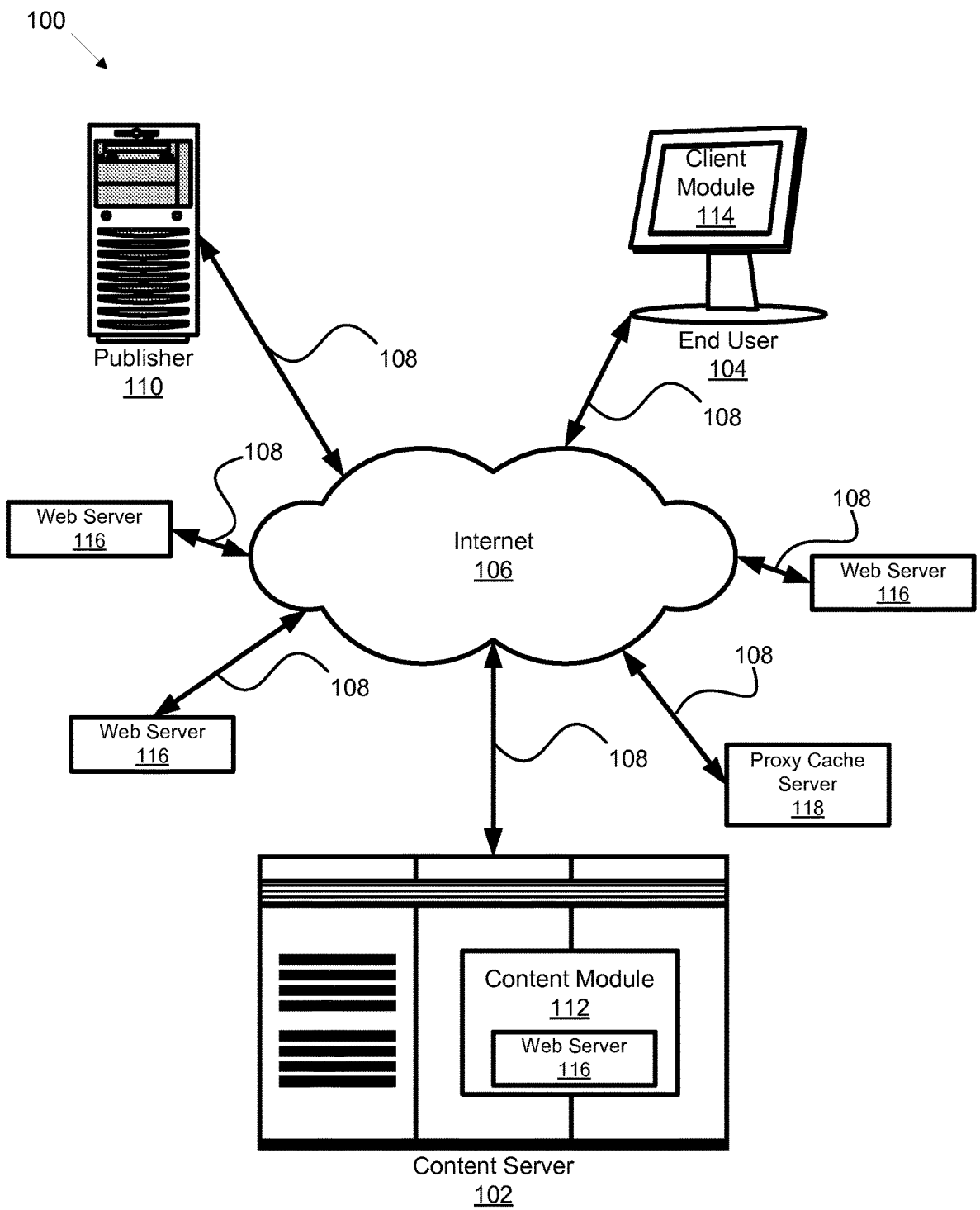
FIG. 1 is a/schematic block diagram illustrating one embodiment of a system for dynamic rate shifting of streaming content in accordance with the present invention.

Many of the functional units described in this specification have been labeled as modules, in order to more particularly emphasize their implementation independence. For example, a module may be implemented as a hardware circuit comprising custom VLSI circuits or gate arrays, off the shelf semiconductors such as logic chips, transistors, or other discrete components. A module may also be, implemented in programmable hardware devices such as field programmable gate arrays programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific, details, or with other methods, components, materials, and so forth. In other instances, well-known structures materials, or operations are not shown or described in detail to a void obscuring aspects of the invention.

FIG. 1 is a schematic block diagram illustrating one embodiment of a system 100 for dynamic rate shifting of streaming content in accordance with the present invention. In one embodiment, the system 100 comprises a content server 102 and an end user 104. The content server 102 and the end user station 104 may be coupled by a data communications network. The data communications network may include the Internet 106 and connections 108 to the Internet 106. Alternatively, the content server 102 and the end user 104 may be located on a common local area network, wireless area network, cellular network, virtual local area network, or the like. The end user station 104 may comprise a personal computer (PC), an entertainment system configured to communicate over a network, a portable electronic device configured to present content or a similarly suitable network accessible presentation device. For example, suitable portable electronic devices may include, but are not limited to cellular phones, portable gaming systems, and portable computing devices.

In the depicted embodiment, the system 100 also includes a publisher 110, and one or more web servers 116. The publisher 110 may be a creator or distributor of content. For example, if the content to be streamed were a broadcast of a television program, the publisher 110 may be a television or cable network channel such as NBC®, or MTV®. Content may be transferred over the Internet 106 to the content server 102, where the content is received by a content module 112. The content module 112 may be configured to receive, process, and store content. In one embodiment, the processed content is received by a client module 114 configured to play the content on the end user station 104. In a further embodiment, the client module 114 is configured to receive different portions of a content stream from a plurality of locations simultaneously. For example, the client module 114 may request and receive content from any of the plurality of web servers 116.

Content from the content server 102 may be replicated to other web servers 116 or alternatively to proxy cache servers 118. Replicating may occur by deliberate forwarding from the content server 102, or by a web, cache, or proxy server put side of the content server 102 asking for content on behalf of the client module 114. In a further embodiment, content may be forwarded directly to web 116 or proxy 118 servers through direct communication channels 120 without the need to traverse the Internet 106.

Figure 2A:
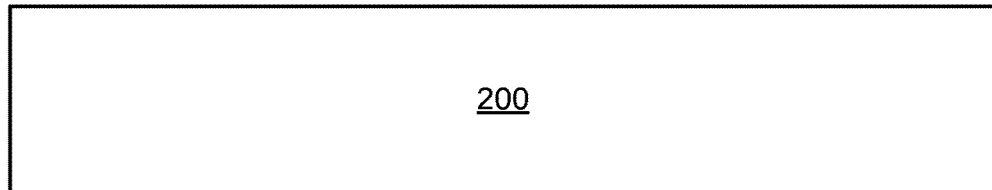
FIG. 2a is a schematic block diagram graphically, illustrating one embodiment of a media content file.

FIG. 2a is a schematic block diagram graphically illustrating one embodiment of a media content (hereinafter "content") file 200. In one embodiment, the content file 200 is distributed by the publisher 110. The content file 200 may comprise a television broadcast, sports event, movie, music, concert, etc. The content file 200 may also be live or archived content. The content file 200 may comprise uncompressed video and audio, or alternatively, video or audio. Alternatively, the content file 200 may be compressed using standard or proprietary encoding schemes. Examples of encoding schemes capable of use with the present invention include, but are not limited to, DivX®, Windows Media Video®, Quicktime Sorenson 3®, On2; OGG Vorbis, MP3, and Quicktime 6.5/MPEG-4® encoded content.

Figure 2B:
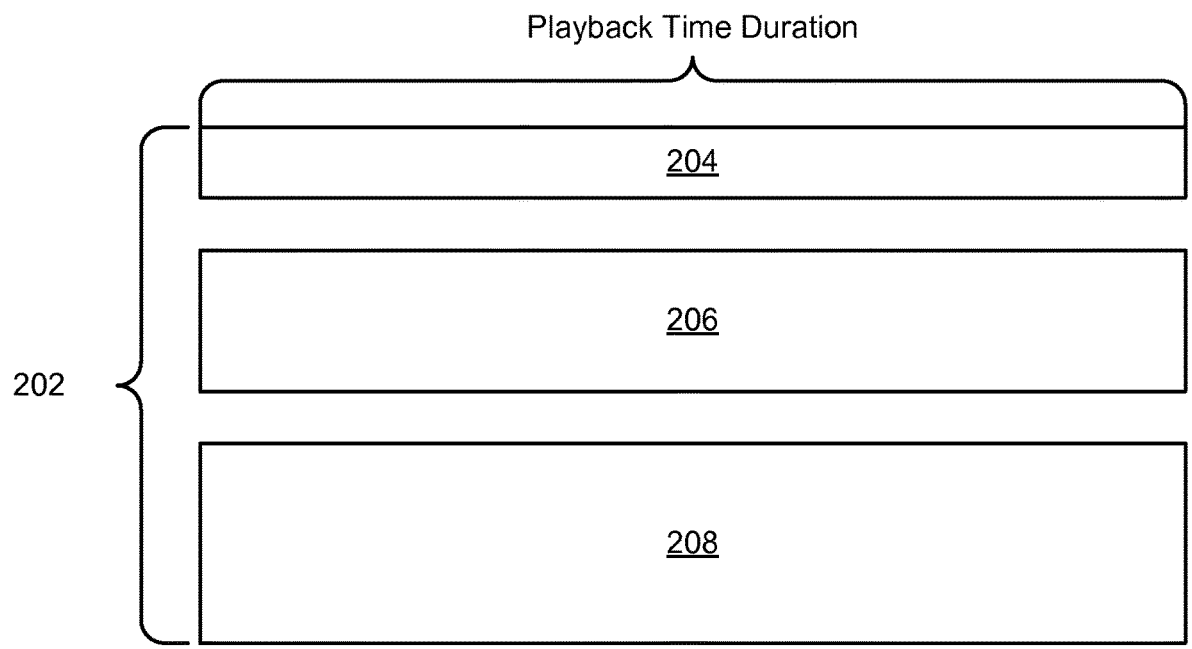
FIG. 2b is a schematic block diagram illustrating one embodiment of a plurality of streams having varying degrees of quality and bandwidth.

FIG. 2b is a schematic block diagram illustrating one embodiment of a plurality of streams 202 having varying degrees of quality and bandwidth. In one embodiment, the plurality of streams 202 comprises a low quality stream 204, a medium quality stream 206, and a high quality stream 208. Each of the streams 204, 206, 208 contains an encoded representation of the content file 200 encoded and compressed to varying bit rates. For example, the low quality stream 204 may be encoded and compressed to a bit rate of 100 kilobits per second (kbps), the medium quality stream 206 may be encoded and compressed to a bit rate of 200 kbps, and the high quality stream 208 may be encoded and compressed to 600 kbps.

Figure 3A:
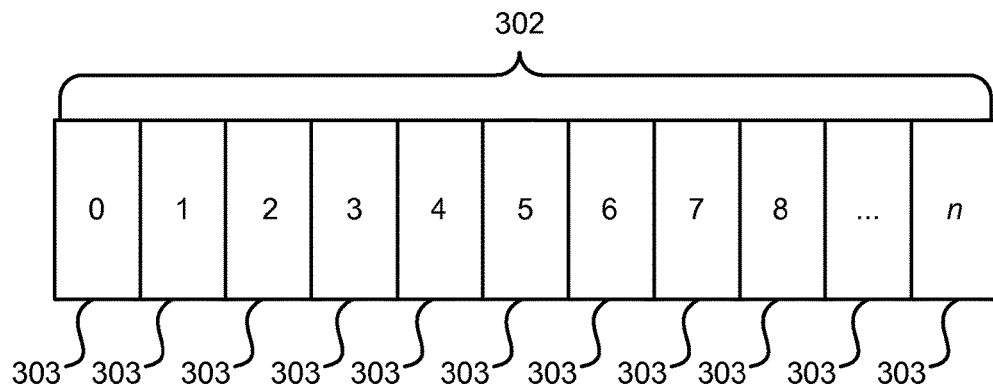
FIG. 3a is a schematic block diagram illustrating one embodiment of a stream divided into a plurality of source streamlets.

FIG. 3a is a schematic block diagram illustrating one embodiment of a stream 302 divided into a plurality of source streamlets 303. As used herein, streamlet refers to any sized portion of the content file 200. Each streamlet 303 may comprise a portion of the content contained in stream 302, encapsulated as an independent media object. The content in a streamlet 303 may have a unique time index in relation to the beginning of the content contained in stream 302. In one embodiment the content contained in each streamlet 303 may have a duration of two seconds. For example, streamlet 0 may have a time index of 00:00 representing the beginning of content playback, and streamlet 1 may have a time index of 00:02, and so on. Alternatively, the time duration of the source streamlets 303 may be any duration smaller than the entire playback duration of the content in stream 302. In a further embodiment, the source streamlets 303 may be divided according to file size instead of a time index and duration.

Figure 3B:
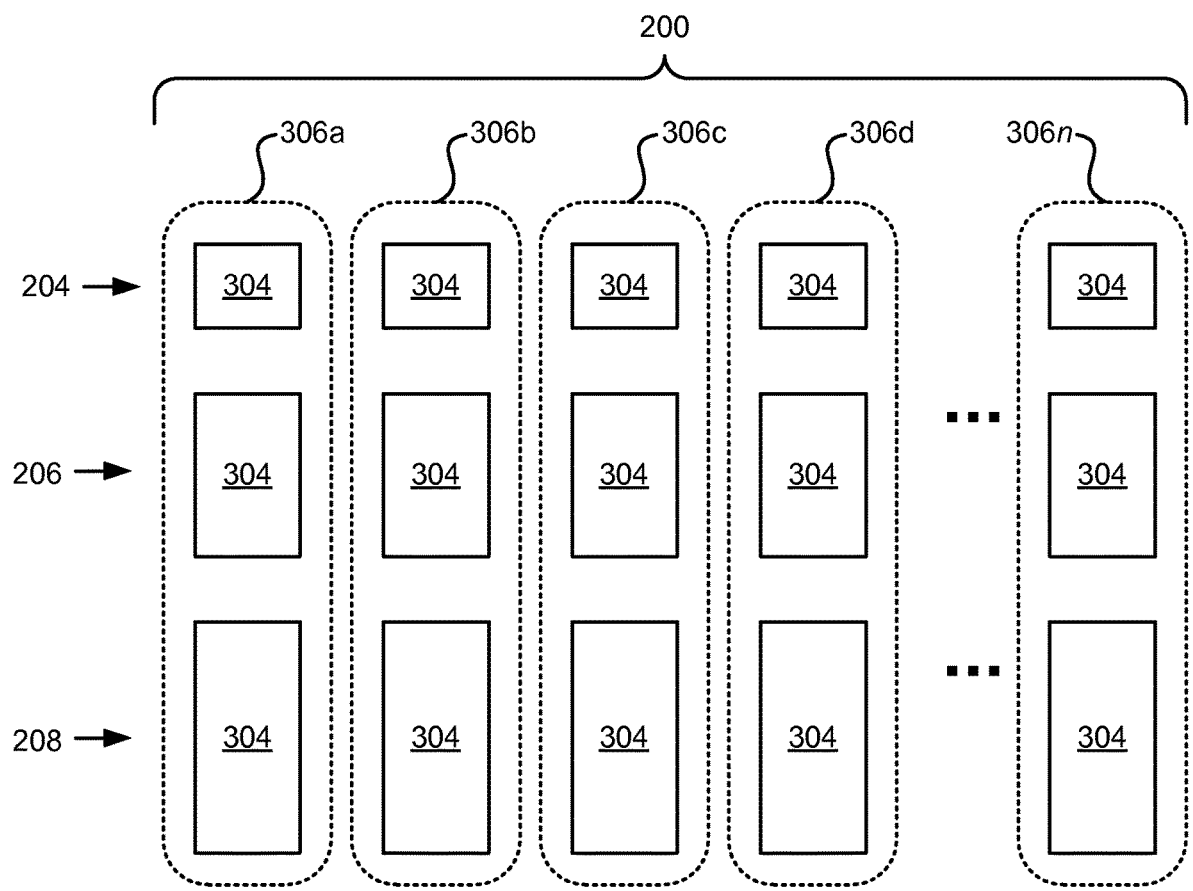
FIG. 3b is a schematic block diagram illustrating one embodiment of sets of streamlets in accordance with the present invention.

FIG. 3b is a schematic block diagram illustrating one embodiment of sets 306 of streamlets 304 in accordance with the present invention. As used herein, the term "set" refers to a group of streamlets 304 having identical time indices and durations but varying bitrates. In the depicted embodiment, the set 306a encompasses all streamlets having a time index of 00:00. The set 306a includes encoded streamlets 304 having low 204, medium 206, and high 208 bitrates. Of course each set 306 may include more than the depicted three bitrates which are given by way of example only. One skilled in the art will recognize that any number of streams having different bitrates may be generated from the original content 200.

As described above, the duration of one streamlet 304 may be approximately two seconds. Likewise each set 306 may comprise a plurality of streamlets 304, where each streamlet 304 has a playable duration of two seconds. Alternatively, the duration of the streamlet 304 may be predetermined or dynamically variable depending upon a variety of factors including, but not limited to, network congestion, system specifications, playback resolution and quality, etc. In the depicted embodiment, the content 200 may be formed of the plurality of sets 306. The number of sets 306 may depend on the length of the content 200 and the length or duration of each streamlet 304.

Figure 4:
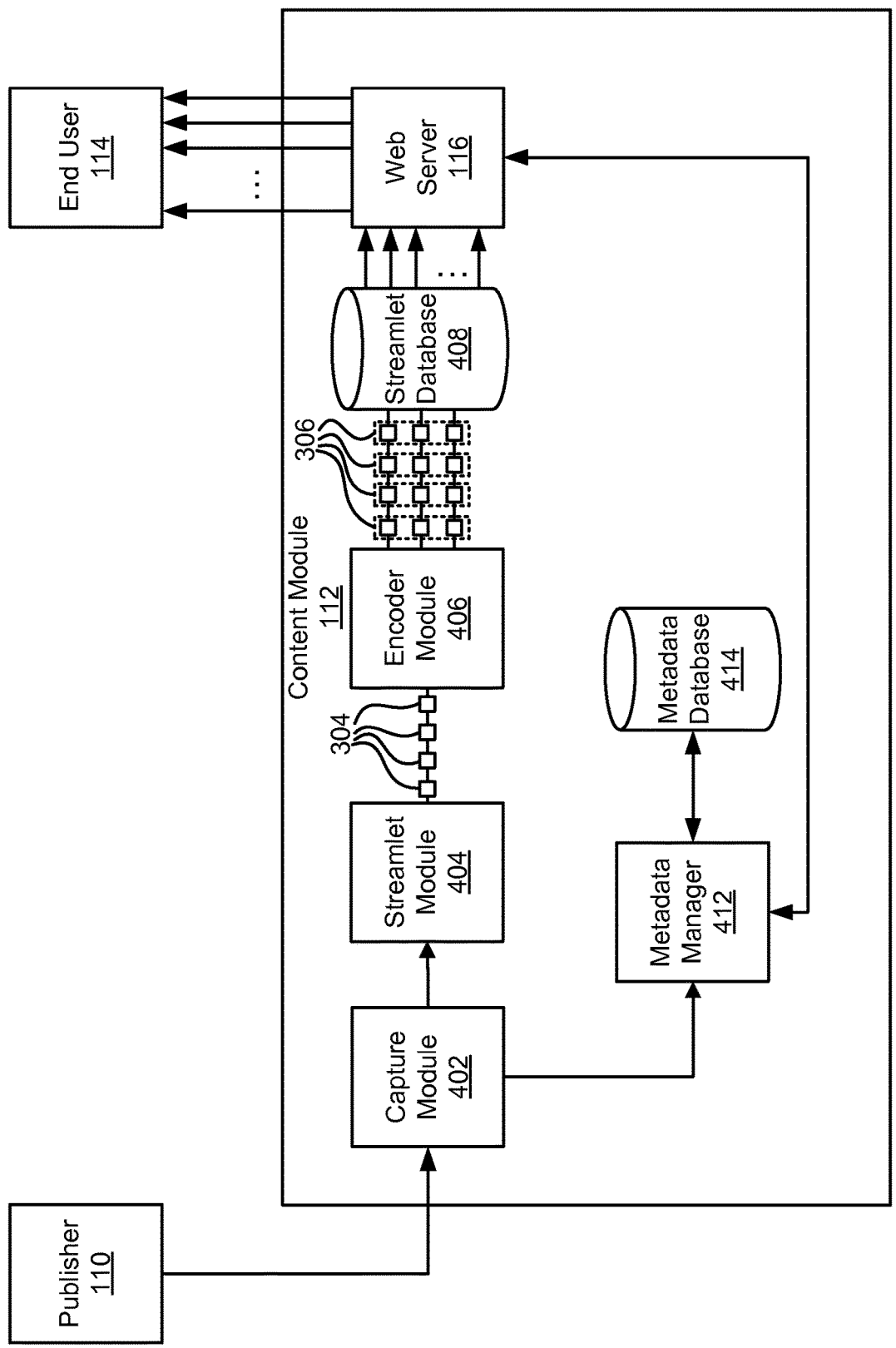
FIG. 4 is a schematic block diagram illustrating in greater detail one embodiment of the content module in accordance with the present invention.

FIG. 4 is a schematic block diagram illustrating in greater detail one embodiment of the content module 112 in accordance with the present invention. The content module 112 may comprise a capture module 402, a streamlet module 404, an encoder module 406, a streamlet database 408, and the web server 116. In one embodiment, the capture module 402 is configured to receive the content file from the publisher 110. The capture module 402 may be configured to "decompress" the content file 200. For example, if the content file 200 arrives having been encoded with one of the above described encoding schemes, the capture module 402 may convert the content file 200 into raw audio and/or video. Alternatively, the content file 200 may be transmitted by the publisher in a format 110 that does not required decompression.

The capture module 402 may comprise a capture card configured for TV and/or video capture. One example of a capture card suitable for use in the present invention is the DRC-2500 by Digital Rapids of Ontario, Canada. Alternatively, any capture card capable of capturing audio and video may be utilized with the present invention. In a further embodiment, the capture module 402 is configured to pass the content file to the streamlet module 404.

The streamlet module 404, in one embodiment, is configured to segment the content file 200 and generate source streamlets 303 that are not encoded. As used herein, the term "segment" refers to an operation to generate a streamlet of the content file 200 having a duration or size equal to or less than the duration or size of the content file 200. The streamlet module 404 may be configured to segment the content file 200 into streamlets 303 each having an equal duration. Alternatively, the streamlet module 404 may be configured to segment the content file 200 into streamlets 303 having equal file sizes.

The encoding module 406 is configured to receive the source streamlets 303 and generate the plurality of streams 202 of varying qualities. The original content file 200 from the publisher may be digital in form and may comprise content having a high bit rate such as, for example, 2 Mbps. The content may be transferred from the publisher 110 to the content module 112 over the Internet 106. Such transfers of data are well known in the art and do not require further discussion herein. Alternatively, the content may comprise a captured broadcast or any other transfer method.

In a further embodiment, the encoding module 406 is configured to generate a plurality of sets 306 of streamlets 304. The sets 306, as described above with reference to FIG. 3b, may comprise streamlets having an identical time index and duration, and a unique bitrate. As with FIG. 3b, the sets 306 and subsequently the plurality of streams 202 may comprise the low quality stream 204, the medium quality stream 206, and the high quality stream 208. Alternatively, the plurality of streams 202 may comprise any number of streams deemed necessary to accommodate end user bandwidth.

The encoder module 406 is further configured to encode each source streamlet 303 into the plurality of streams 202 and streamlet sets 306 and store the streamlet in the streamlet database 408. The encoding module 406 may utilize encoding schemes such as DivX®, Windows Media Video 9®, Quicktime 6.5 Sorenson 3®, or Quicktime 6.5/MPEG-4®. Alternatively, a custom encoding scheme may be employed.

The content module 112 may also include a metadata module 412 and a metadata database 414. In one embodiment, metadata comprises static searchable content information. For example, metadata may include, but, is not limited to, air date of the content, title, actresses, actors, length, and episode name. Metadata is generated by the publisher 110, and may be configured to define an end user environment. In one embodiment, the publisher 100 may define an end user navigational environment for the content including menus, thumbnails, sidebars, advertising, etc. Additionally, the publisher 110 may define functions such as fast forward, rewind, pause, and play that may be used with the content file 200.

The metadata module 412 is configured to receive the metadata from the publisher 110 and store the metadata in the metadata database 414. In a further embodiment, the metadata module 412 is configured to interface with the client module 114, allowing the client module 114 to search for content based upon at least one of a plurality of metadata criteria. Additionally, metadata may be generated by the content module 112 through automated process(es) or manual definition.

In certain embodiments, once the streamlets 304 have been received and processed, the client module 114 may request streamlets 304 using HTTP from the web server 116. Using a standard protocol such as HTTP eliminates the need for network administrators to configure firewalls to recognize and pass through networks traffic for a new specialized protocol. Additionally, since the client module 114 initiates the request, the web server 116 is only required to retrieve and serve the requested streamlet 304. In a further embodiment, the client module 114 may be configured to retrieve streamlets 304 from a plurality of web servers 116.

Each web server 116 may be located in various locations across the Internet 106. The streamlets 304 may essentially be static files. As such, no specialized media server or server-side intelligence is required for a client module 114 to retrieve the streamlets 304. The streamlets 304 may be served by the web server 116 or cached by cache servers of Internet Service Providers (ISPs), or any other network infrastructure operators, and served by the cache server. Use of cache servers is well known to those skilled in the art, and will not be discussed further herein. Thus, a highly scalable solution is provided that is not hindered by massive amounts of client module 114 requests to the web server 116 at any specific location, especially the web server 116 most closely associated with or within the content module 112.

Figure 5A:
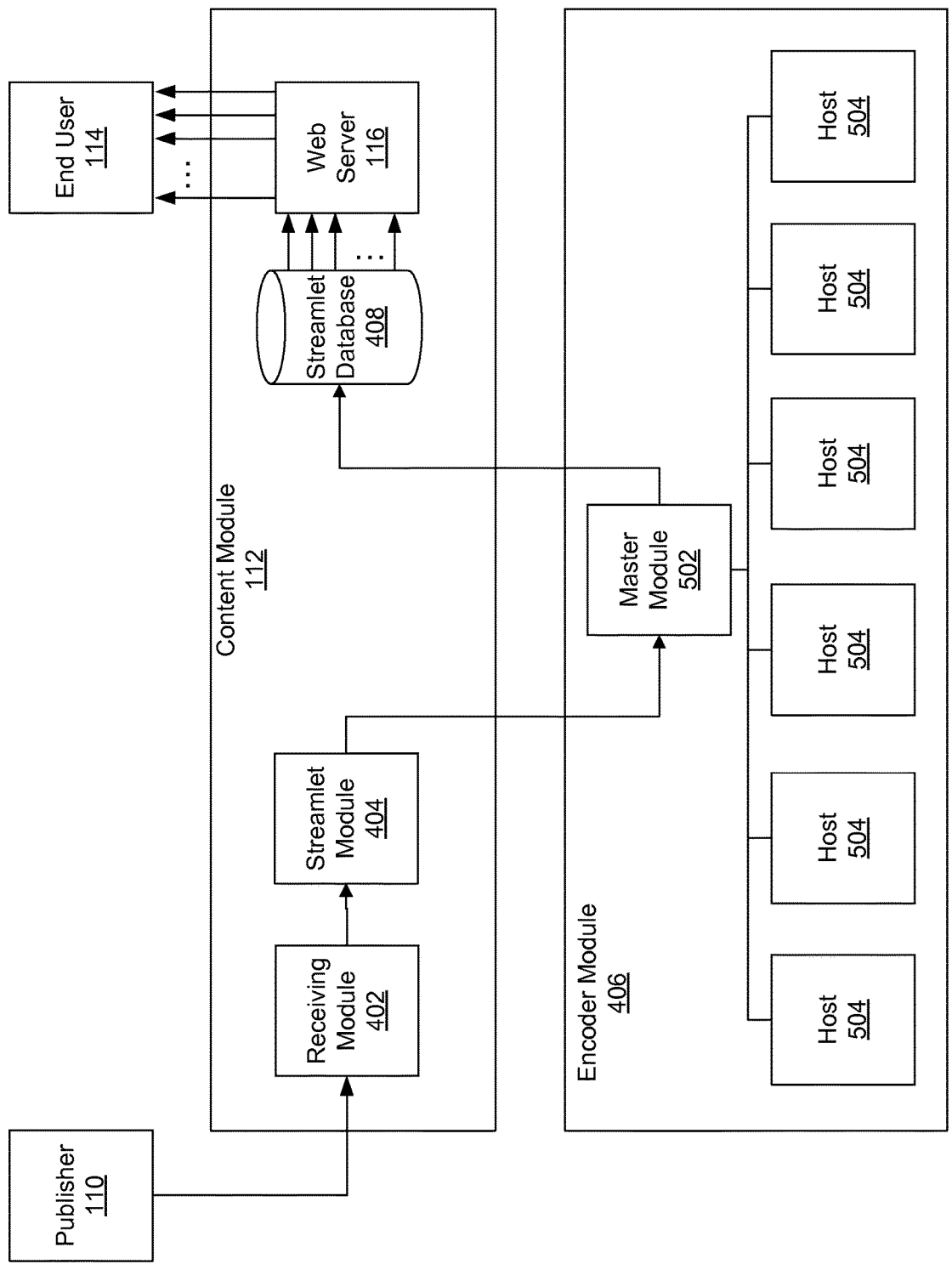
FIG. 5a is a schematic block diagram illustrating, one embodiment of an encoder module in accordance with the present invention.

FIG. 5a is a schematic block diagram illustrating one embodiment of an encoder module 406 in accordance with the present invention. In one embodiment, the encoder module 406 may include a master module 502 and a plurality of host computing modules (hereinafter "host") 504. The hosts 504 may comprise personal computers, servers, etc. In a further embodiment, the hosts 504 may be dedicated hardware, for example, cards plugged into a single computer.

The master module (hereinafter "master") 502 is configured to receive streamlets 303 from the streamlet module 404 and stage the streamlet 303 for processing. In one embodiment, the master 502 may decompress each source streamlet 303 to produce a raw streamlet. As used herein, the term "raw streamlet" refers to a streamlet 303 that is uncompressed or lightly compressed to substantially reduce size with no significant loss in quality. A lightly compressed raw streamlet can be transmitted more quickly and to more hosts. Each host 504 is coupled with the master 502 and configured to receive a raw streamlet from the master 502 for encoding. The hosts 504, in one example, generate a plurality of streamlets 304 having identical time indices and durations and varying bitrates. In one embodiment, each host 504 is configured to generate a set 306 from the raw streamlet 503 sent from the master 502. Alternatively, each host 504 may be dedicated to producing a single bitrate in order to reduce the time required for encoding.

Upon encoding completion, the host 504 returns the set 306 to the master 502 so that the encoding module 406 may store the set 306 in the streamlet database 408. The master 502 is further configured to assign encoding jobs to the hosts 504. Each host is configured to submit an encoding job completion bid (hereinafter "bid"). The master 502 assigns encoding jobs depending on the bids from the hosts 504. Each host 504 generates a bid depending upon a plurality of computing variables which may include, but are not limited to, current encoding job completion percentage, average job completion time, processor speed and physical memory capacity.

For example, a host 504 may submit a bid that indicates that based on past performance history the host 504 would be able to complete the encoding job in 15 seconds. The master 502 is configured to select from among a plurality of bids the best bid and subsequently submit the encoding job to the host 504 with the best bid. As such, the described encoding system does not require that each host 504 have identical hardware, but beneficially takes advantage of the available computing power of the hosts 504. Alternatively, the master 502 selects the host 504 based on a first come first serve basis, or some other algorithm deemed suitable for a particular encoding job.

The time required to encode one streamlet 304 is dependent upon the computing power of the host 504, and the encoding requirements of the content file 200. Examples of encoding requirements may include, but are not limited to, two or multi-pass encoding, and multiple streams of different bitrates. One benefit of the present invention is the ability to perform two-pass encoding on a live content file 200. Typically, in order to perform two-pass encoding prior art systems must wait for the content file to be completed before encoding.

The present invention, however, segments the content file 200 into source streamlets 303 and the two-pass encoding to a plurality of streams 202 may be performed on each corresponding raw streamlet without waiting for a TV show to end, for example. As such, the content module 112 is capable of streaming the streamlets over the Internet shortly after the content module 402 begins capture of the content file 200. The delay between a live broadcast transmitted from the publisher 110 and the availability of the content depends on the computing power of the hosts 504.

Figure 5B:
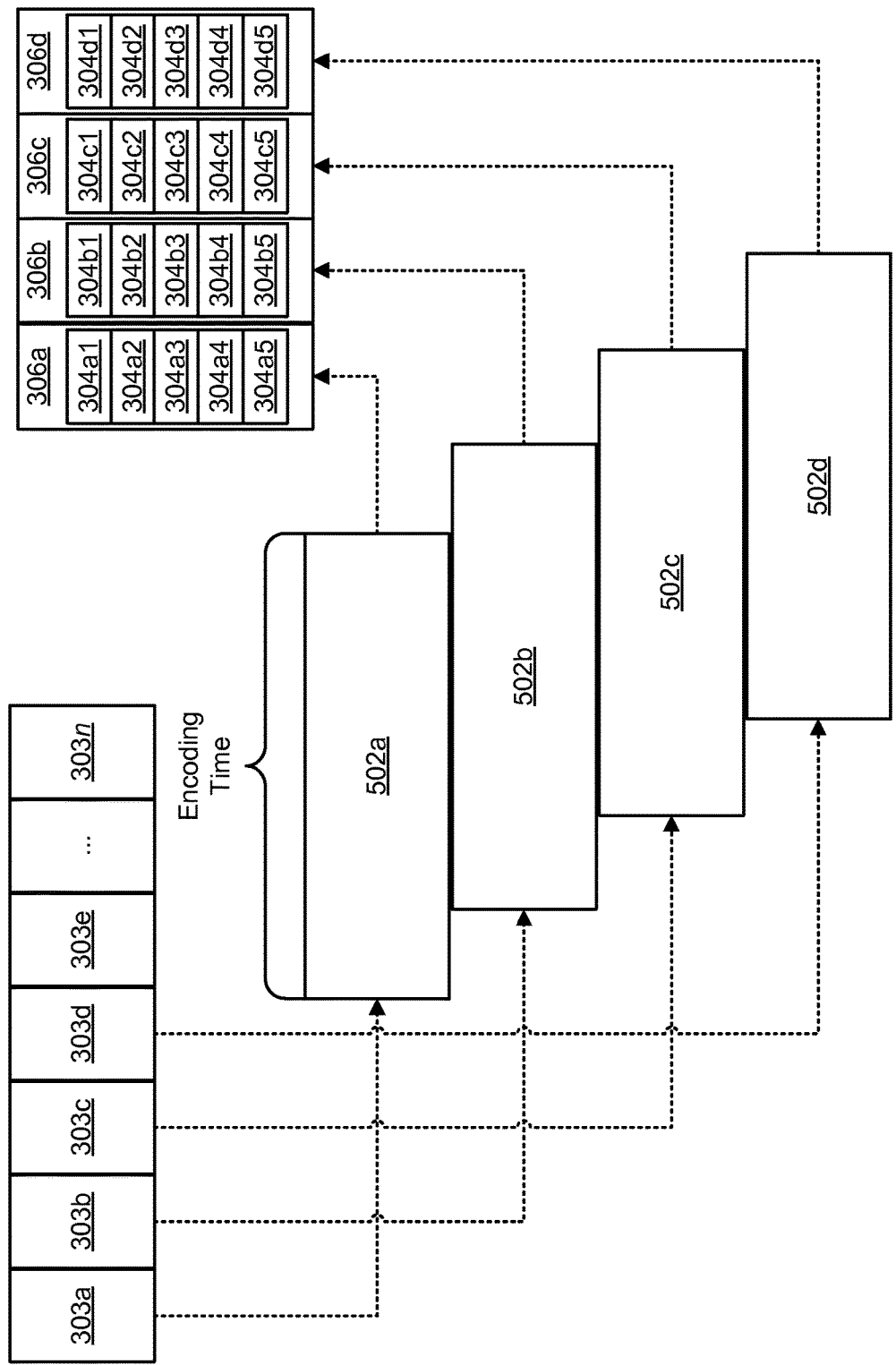
FIG. 5b is a schematic block diagram illustrating one embodiment of parallel encoding of streamlets in accordance with the present invention.

FIG. 5b is a schematic block diagram illustrating one embodiment of parallel encoding of streamlets in accordance with the present invention. In one example, the capture module 402 (of FIG. 4) begins to capture the content file 402 and the streamlet module 404 generates a first streamlet 303a and passes the streamlet to the encoding module 406. The encoding module 406 may take 10 seconds, for example, to generate the first set 306a of streamlets 304a ($304a_1$, $304a_2$, $304a_3$, etc. represent streamlets 304 of different bitrates). FIG. 5b illustrates the encoding process generically as block 502 to graphically illustrate the time duration required to process a raw or lightly encoded streamlet 303 as described above with reference to the encoding module 406. The encoding module 406 may simultaneously process more than one streamlet 303, and processing of streamlets will begin upon arrival of the streamlet from the capture module 402.

During the 10 seconds required to encode the first streamlet 303a, the streamlet module 404 has generated five additional 2 second streamlets 303b, 303c, 303d, 303e, 303f, for encoding and the master 502 has prepared and staged the corresponding raw streamlets. Two seconds after the first set 306a is available the next set 306b is available, and so on. As such, the content file 200 is encoded for streaming over the Internet and appears live. The 10 second delay is given herein by way of example only. Multiple hosts 504 may be added to the encoding module 406 in order to increase the processing capacity of the encoding module 406. The delay may be shortened to an almost unperceivable level by the addition of high CPU powered systems, or alternatively multiple low powered systems.

A system as described above beneficially enables multi-pass encoding of live events. Multi-pass encoding systems of the prior art require that the entire content be captured (or be complete) because in order to perform multi-pass encoding the entire content must be scanned and processed more than once. This is impossible with prior art systems because content from a live event is not complete until the event is over. As such, with prior art systems, multi-pass encoding can only be performed once the event is over. Streamlets, however, may be encoded as many times as is deemed necessary. Because the streamlet is an encapsulated media object of 2 seconds (for example), multi-pass encoding may begin on a live event once the first streamlet is captured. Shortly after multi-pass encoding of the first streamlet 303a is finished, multi-pass encoding of the second streamlet 303b finishes, and as such multi-pass encoding is performed on a live event and appears live to a viewer.

Any specific encoding scheme applied to a streamlet may take longer to complete than the time duration of the streamlet itself. For example, a very high quality encoding of a 2-second streamlet may take 5 seconds to finish. Alternatively, the processing time required for each streamlet may be less than the time duration of a streamlet. However, because the offset parallel encoding of successive streamlets are encoded by the encoding module at regular intervals (matching the intervals at which the those streamlets are submitted to the encoding module 406, for example 2 seconds) the output timing of the encoding module 406 does not fall behind the real-time submission rate of the unencoded streamlets. Conversely, prior art encoding systems rely on the very fastest computing hardware and software because the systems must generate the output immediately in lock-step with the input. A prior art system that takes 2.1 seconds to encode 2 seconds worth of content is considered a failure. The present invention allows for slower than real-time encoding processes yet still achieves a real-time encoding effect due to the parallel offset pipelines.

The parallel offset pipeline approach described with reference to FIG. 5b beneficially allows for long or short encoding times without "falling, behind" the live event. Additionally, arbitrarily complex encoding of streamlets to multiple profiles and optimizations only lengthens the encoding time 502 without a perceptible difference to a user because the sets 306 of streamlets 304 are encoded in a time-selective manner so that streamlets are processed at regular time intervals and transmitted at these time intervals.

Returning now to FIG. 5a, as depicted, the master 502 and the hosts 504 may be located within a single local area network, or in other terms, the hosts 504 may be in close physical proximity to the master 502. Alternatively, the hosts 504 may receive encoding jobs from the master 502 over the Internet or other communications network. For example, consider a live sports event in a remote location where it would be difficult to set up multiple hosts. In this example, a master performs no encoding, or alternatively light encoding before publishing the streamlets online. The hosts 504 would then retrieve those streamlets and encode the streamlets into the multiple bitrate sets 306 as described above.

Furthermore, hosts 504 may be dynamically added or removed from the encoding module without restarting the encoding job and/or interrupting the publishing of streamlets. If a host 504 experiences a crash or some failure, its encoding work is simply reassigned to another host.

The encoding module 406, in one embodiment, may also be configured to produce streamlets that are specific to a particular playback platform. For example, for a single raw streamlet, a single host 504 may produce streamlets for different quality levels for personal computer playback, streamlets for playback on cell phones with a different proprietary codec, a small video-only streamlet for use when playing just a thumbnail view of the stream (like in a programming guide), and a very high quality streamlet for use in archiving.

Figure 6A:
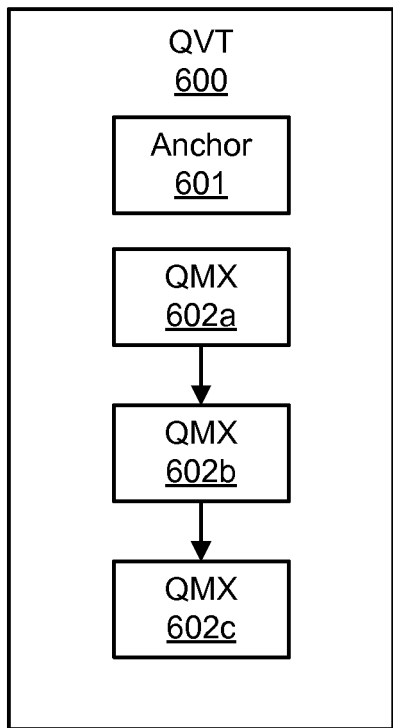
FIG. 6a is a schematic block diagram illustrating one embodiment of a virtual timeline in accordance with the present invention.

FIG. 6a is a schematic block diagram illustrating one embodiment of a virtual timeline module, also referred to herein as a quantum virtual timeline, or VT 600 in accordance with the present invention. In one embodiment, the virtual timeline module 600 comprises an anchor module 601 and at least one data module (hereinafter referred to as "quantum media extension" or "QMX") 602. The quantum media extension 602, in the depicted embodiment, describes an entire content file 200. Therefore, the virtual timeline (hereinafter "VT") 600 may comprise a file that is configured to define a playlist for a user to view. For example, the VT may indicate that the publisher desires a user to watch a first show identified by QMX 602a followed by shows identified by QMX 602b and QMX 602c. As such, the publisher may define a broadcast schedule in a manner similar to a television station.

The anchor module 601 is configured to "anchor" or associate the start of a timeline 600 with an actual point in time, such that upon playback the client device can start playback with a position that reflects "now" in the timeline. For example, a timeline 600 could be anchored to 10 am MDT on Mar. 25, 2007. If at 11 am MDT a user begins viewing the timeline 600, the client device could note that 1 hour has elapsed since the point in time the timeline is anchored to, so playback would begin 1 hour into the timeline. Alternatively, playback would commence at the beginning of the timeline and a viewer would effectively be "behind" by 1 hour.

This arrangement simulates normal television viewing, where a person turns on the TV and views whatever content is now playing, and two people in different locations viewing the same channel see the same show, even if one of them has been watching for several hours and the other has just turned on the TV. The anchor module 601 may be configured to optionally enable "anchoring" and can be combined with other functionality such as rewinding or fast-forwarding to prevent a user from fast-forwarding past the event horizon (see FIG. 14) or rewinding past the event horizon force live viewing).

In a further embodiment, the anchor module 601 is configured to associate the timeline 600 with a time relative to the local time zone of the client device. For example, the timeline 600 may be associated with the start of the day in the local time zone of the client device. Accordingly, a publisher could advertise a certain event starting at 6:00 pm and regardless of the local time zone of the client device, the event would appear to start at 6:00 pm.

Figure 6B:
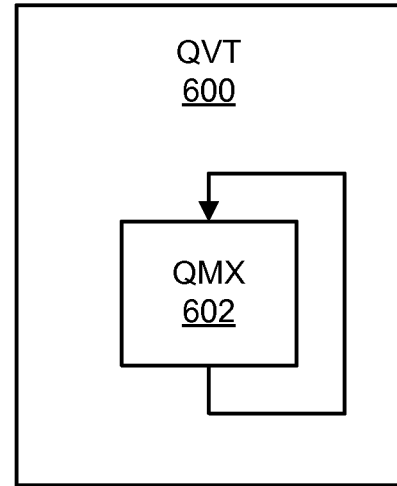
FIG. 6b is a schematic block diagram illustrating an alternative embodiment of a virtual timeline in accordance with the present invention.

FIG. 6b is a schematic block diagram illustrating an alternative embodiment of a VT 600 in accordance with the present invention. In the depicted embodiment, the VT 600 may include a single QMX 602 which indicates that the publisher desires the same content to be looped over and over again. For example, the publisher may wish to broadcast a never ending infomercial on a website.

In one embodiment, the VT 600 may also be "marked" as readable. For example, a VT 600 may indicate to a client device that the client device must check for an updated VT 600 on the web server every 5 minutes. The updated VT 600 may contain an updated QMX 602 order. Accordingly, a publisher is able to dynamically alter the scheduled playout of content without interrupting playback of the content on the client device.

Figure 6C:
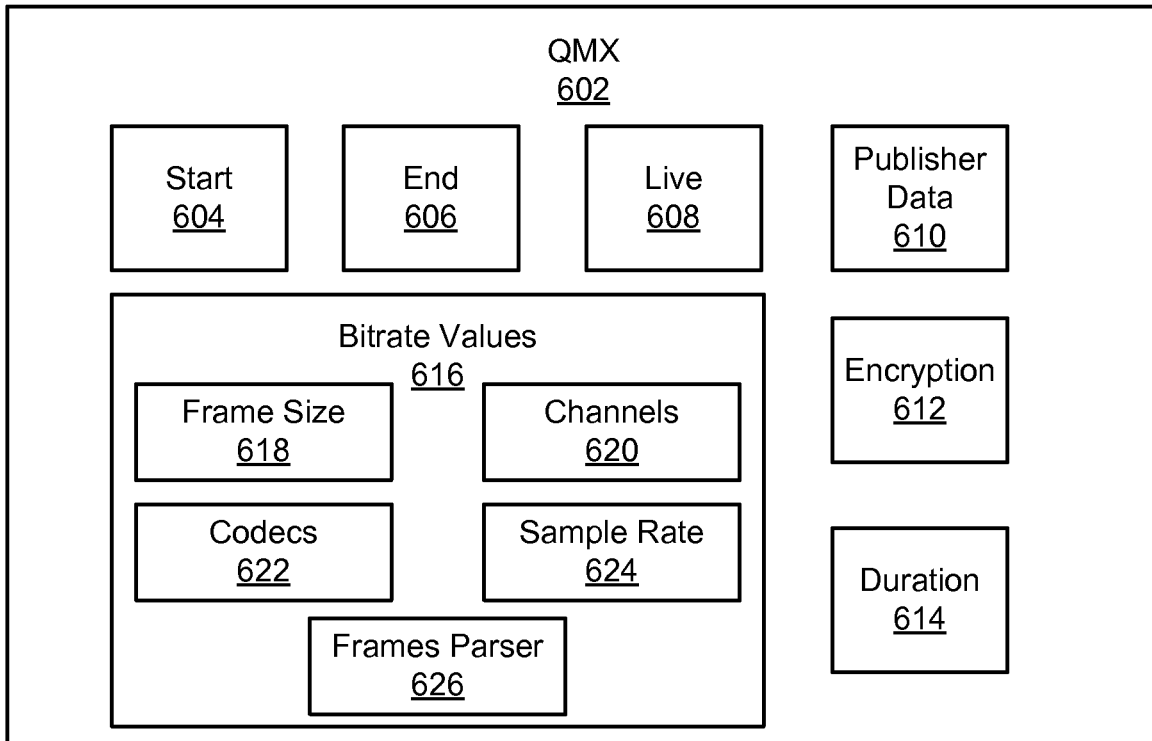
FIG. 6c is a schematic block diagram, illustrating one embodiment of a data module in accordance with the present invention.

FIG. 6c is a schematic block diagram illustrating one embodiment of a QMX 602 in accordance with the present invention. In one embodiment, the QMX 602 contains various types of information generated by the content module 112 to describe the content file 200. Examples of the types of information that may be included in a QMX 602 include, but are not limited to, start index 604, end index 606, whether the content is live 608, proprietary publisher data 610, encryption level 612, content duration 614 and bitrate values 616. The bitrate values 616 may include frame size 618, audio channel 620 information, codecs 622 used, sample rate 624, and frames parser 626.

A publisher may utilize the QVT 600 together with the QMX 602 in order to prescribe a playback order for users or alternatively to selectively edit content. For example, a publisher may indicate in the QVT 600 that audio should be muted at time index 10:42 or video should be skipped for 3 seconds at time index 18:35. As such, the publisher may selectively skip offensive content without the processing requirements of editing the content.

Figure 7:
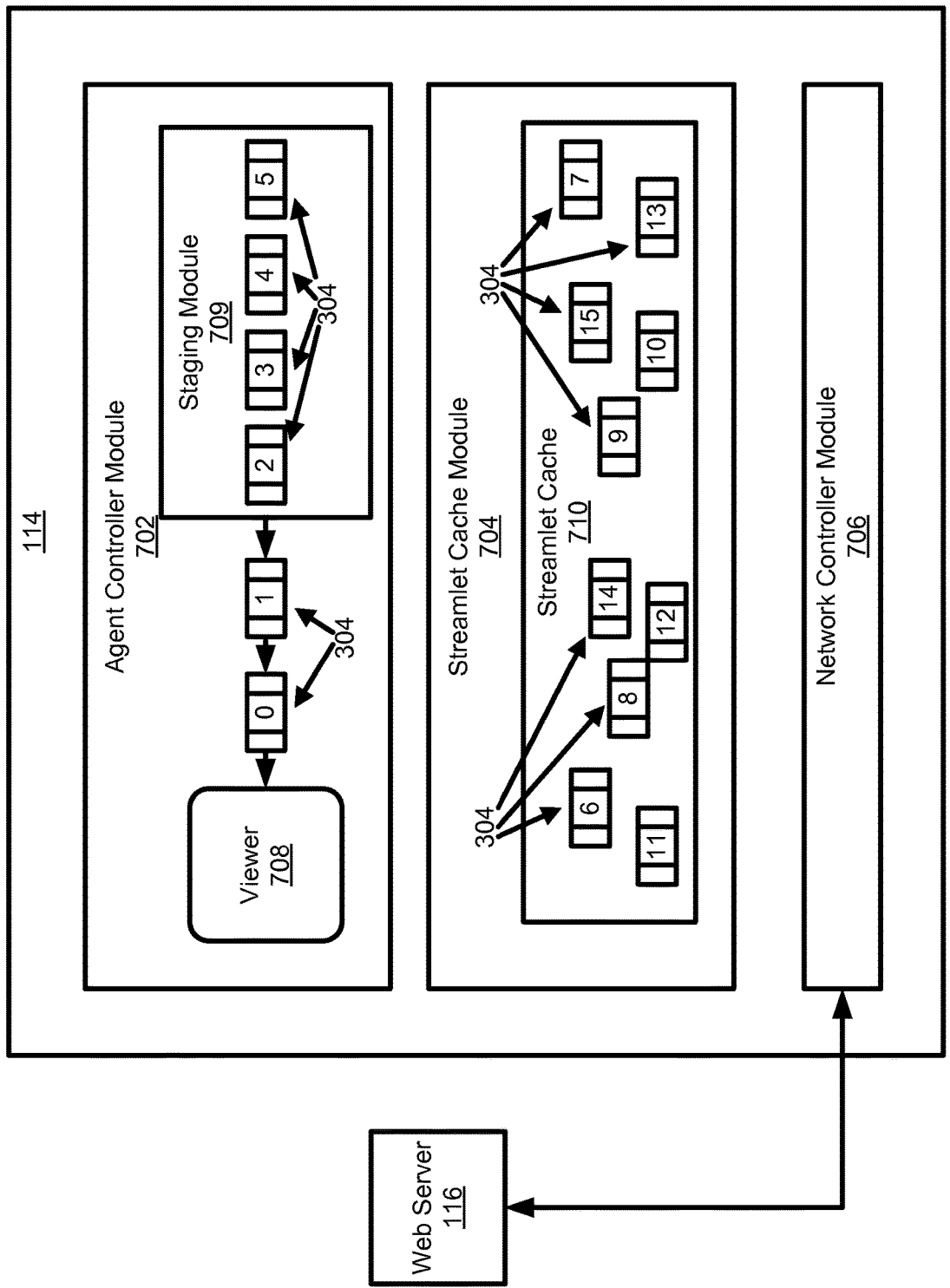
FIG. 7 is a schematic block diagram graphically illustrating one embodiment of a client module in accordance with the present invention.

FIG. 7 is a schematic block diagram graphically illustrating one embodiment of a client module 114 in accordance with the present invention. The client module 114 may comprise an agent controller module 702, a streamlet cache module 704, and a network controller module 706. In one embodiment, the agent controller module 702 is configured to interface with a viewer 708, and transmit streamlets 304 to the viewer 708. Alternatively, the agent controller module 702 may be configured to simply reassemble streamlets into a single file for transfer to an external device such as a portable video player.

In a further embodiment, the client module 114 may comprise a plurality of agent controller modules 702. Each agent controller module 702 may be configured to interface with one viewer 708. Alternatively, the agent controller module 702 may be configured to interface with a plurality of viewers 708. The viewer 708 may be a media player (not shown) operating on a PC or handheld electronic device.

The agent controller module 702 is configured to select a quality level of streamlets to transmit to the viewer 708. The agent controller module 702 requests lower or higher quality streams based upon continuous observation of time intervals between successive receive times of each requested streamlet. The method of requesting higher or lower quality streams will be discussed in greater detail below with reference to FIG. 10.

The agent controller module 702 may be configured to receive user commands from the viewer 708. Such commands may include play, fast forward, rewind, pause, and stop. In one embodiment, the agent controller module 702 requests streamlets 304 from the streamlet cache module 704 and arranges the received streamlets 304 in a staging module 709. The staging module 709 may be configured to arrange the streamlets 304 in order of ascending playback time. In the depicted embodiment, the streamlets 304 are numbered 0, 1, 2, 3, 4, etc. However, each streamlet 304 may be identified with a unique filename.

Additionally, the agent controller module 702 may be configured to anticipate streamlet 304 requests and pre-request streamlets 304. By pre-requesting streamlets 304, the user may fast-forward, skip randomly, or rewind through the content and experience no buffering delay. In a further embodiment, the agent controller module 702 may request the streamlets 304 that correspond to time index intervals of 30 seconds within the total play time of the content. Alternatively, the agent controller module 702 may request streamlets at any interval less than the length of the time index. This enables a "fast-start" capability with no buffering wait when starting or fast-forwarding through content file 200. In a further embodiment, the agent controller module 702 may be configured to pre-request streamlets 304 corresponding to specified index points within the content or within other content in anticipation of the end user 104 selecting new content to view.

In one embodiment, the streamlet cache module 704 is configured to receive streamlet 304 requests from the agent controller module 702. Upon receiving a request, the streamlet cache module 704 first checks a streamlet cache 710 to verify if the streamlet 304 is present. In a further embodiment, the streamlet cache module 704 handles streamlet 304 requests from a plurality of agent controller modules 702. Alternatively, a streamlet cache module 704 may be provided for each agent controller module 702. If the requested streamlet 304 is not present in the streamlet cache 410, the request is passed to the network controller module 706. In order to enable fast forward and rewind capabilities, the streamlet cache module 704 is configured to store the plurality of streamlets 304 in the streamlet cache 710 for a specified time period after the streamlet 304 has been viewed. However once the streamlets 304 have been deleted, they may be requested again from the web server 116.

The network controller module 706 may be configured to receive streamlet requests from the streamlet cache module 704 and open a connection to the web server 116 or other remote streamlet 304 database (not shown). In one embodiment, the network controller module 706 opens a TCP/IP connection to the web server 116 and generates a standard HTTP GET request for the requested streamlet 304. Upon receiving the requested streamlet 304, the network controller module 706 passes, the streamlet 304 to the streamlet cache module 704 where it is stored in the streamlet cache 710. In a further embodiment, the network controller module 706 is configured to process and request a plurality of streamlets 304 simultaneously. The network controller module 706 may also be configured to request a plurality of streamlets, where each streamlet 304 is subsequently requested in multiple parts.

In a further embodiment, streamlet requests may comprise requesting pieces of any streamlet file. Splitting the streamlet 304 into smaller pieces or portions beneficially allows for an increased efficiency potential, and also eliminates problems associated with multiple full-streamlet requests, sharing the bandwidth at any given moment. This is achieved by using parallel TCP/IP connections for pieces of the streamlets 304'. Consequently, efficiency and network loss problems are overcome, and the streamlets arrive with more useful and predictable timing.

In one embodiment, the client module 114 is configured to use multiple. TCP connections between the client module 114 and the web server 116 or web cache. The intervention of a cache may be transparent to the client or configured by the client as a forward cache. By requesting more than one streamlet 304 at a time in a manner referred to as "parallel retrieval" or more than one part of a-streamlet 304 at a time, efficiency is raised significantly and latency is virtually eliminated. In a further embodiment, the client module allows a maximum of three outstanding-streamlet 304 requests. The client module 114 may maintain additional open TCP connections as spares to be available should another connection fail. Streamlet 304 requests are rotated among all open connections to keep the TCP flow logic for any particular connection from falling into a slow-start or close mode. If the network controller module 706 has requested a streamlet 304 in multiple parts, with each part requested on mutually independent TCP/IP connections, the network controller module 706 reassembles the parts to present a complete streamlet 304 for use by all other components of the client module 114.

When a TCP connection fails completely, a new request may be sent on a different connection for the same streamlet 304. In a further embodiment, if a request is not being satisfied in a timely manner, a redundant request may be sent on a different connection for the same streamlet 304. If the first streamlet request's response arrives before the redundant request response, the redundant request can be aborted. If the redundant request response arrives before the first request response, the first request may be aborted.

Several streamlet requests may be sent on a single TCP connection, and the responses are caused to flow back in matching order along the same connection. This eliminates all but the first request latency. Because multiple responses are always being transmitted, the processing latency of each new streamlet response after the first is not a factor in performance. This technique is known in the industry as "pipelining." Pipelining offers efficiency in request-response processing by eliminating most of the effects of request latency. However, pipelining has serious vulnerabilities. Transmission delays affect all of the responses. If the single TCP connection fails, all of the outstanding requests and responses are lost. Pipelining causes a serial dependency between the requests.

Multiple TCP connections may be opened between the client mobile 114 and the web server 116 to achieve the latency-reduction efficiency benefits of pipelining while maintaining the independence of each streamlet 304 request. Several streamlet 304 requests may be sent concurrently, with each request being sent on a mutually distinct TCP connection. This technique is labeled "virtual pipelining" and is an innovation of the present invention. Multiple responses may be in transit concurrently, assuring that communication bandwidth between the client module 114 and the web server 116 is always being utilized. Virtual pipelining eliminates the vulnerabilities of traditional pipelining. A delay in or complete failure of one response does not affect the transmission of other responses because each response occupies an independent TCP connection. Any transmission bandwidth not in use by one of multiple responses (whether due to delays or TCP connection failure) may be utilized by other outstanding responses.

A single streamlet request may be issued for an entire streamlet, or multiple requests may be issued, each for a different pair or portion of the streamlet. If the streamlet is requested in several parts, the parts may be recombined by the client module 114 streamlet.

In order to maintain a proper balance between maximized bandwidth utilization and response time, the issuance of new streamlet requests must be timed such that the web server 116 does not transmit the response before the client module 114 has fully received a response to one of the previously outstanding streamlet requests. For example, if three streamlet requests are outstanding, the client-module 114 should issue the next request slightly before one of the three responses is fully received and "out of the pipe." In other words, request timing is adjusted to keep three responses in transit. Sharing of bandwidth among four responses diminishes the net response time of the other three responses. The timing adjustment may be calculated dynamically by observation, and the request timing adjusted accordingly to maintain the proper balance of efficiency and response times.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
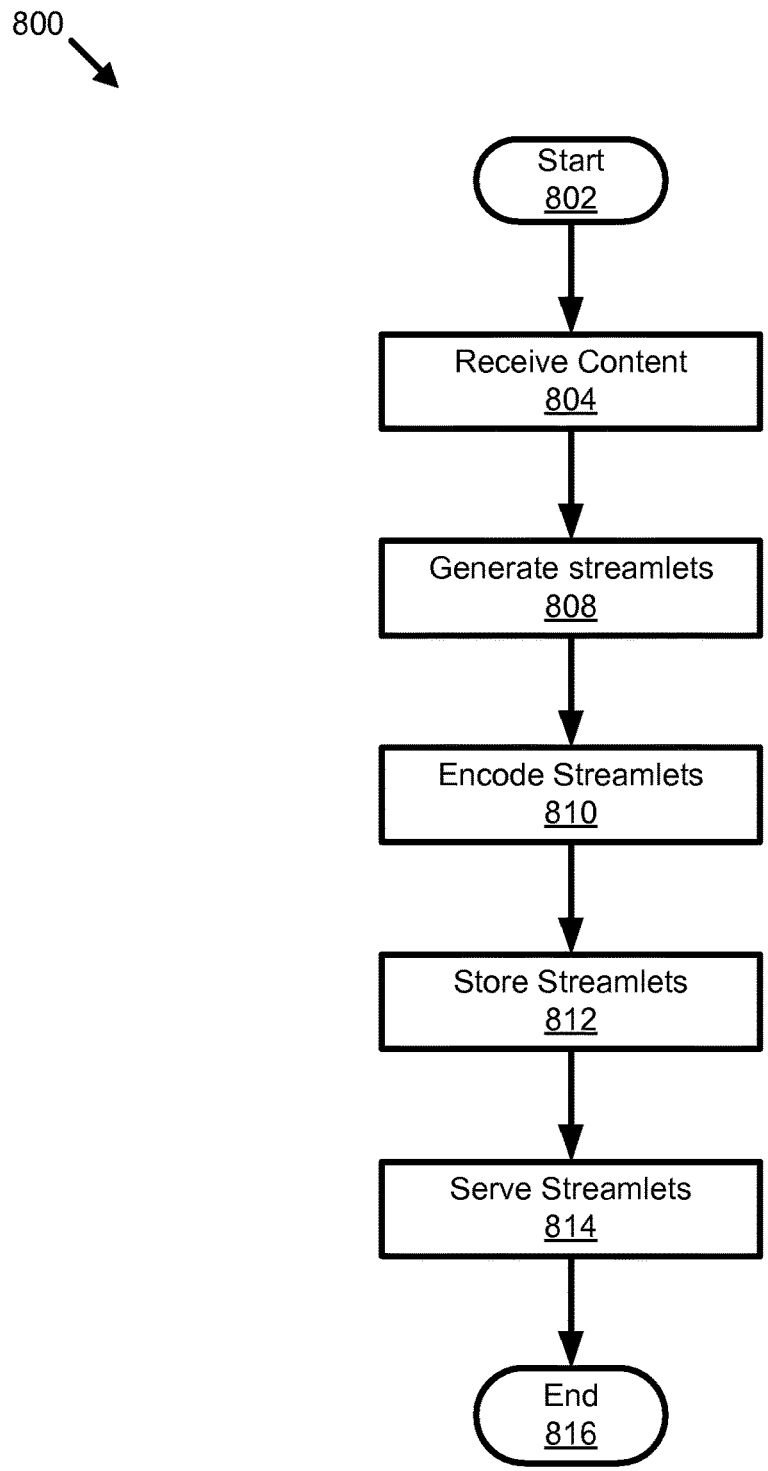
FIG. 8 is a schematic flow chart diagram illustrating one embodiment of a method for processing content in accordance with the present invention.

FIG. 8 is a schematic flow chart diagram illustrating one embodiment of a method 800 for processing content in accordance with the present invention. In one embodiment the method 800 starts 802, and the content module 112 receives 804 content from the publisher 110. Receiving content 804 may comprise receiving 804 a digital copy of the content file 200, or digitizing a physical copy of the content file 200. Alternatively, receiving 804 content may comprise capturing a radio television, cable, or satellite broadcast. Once received 804, the streamlet module 404 generates 808 a plurality of source streamlets 303 each having a fixed duration. Alternatively, the streamlets 303 may be generated with a fixed file size.

In one embodiment, generating 808 streamlets comprises dividing the content file 200 into a plurality of two second streamlets 303. Alternatively, the streamlets may have any length less than or equal to the length of the stream 202. The encoder module 406 then encodes 810 the streamlets 303 into sets 306 of streamlets 304, in a plurality of streams 202 according to an encoding scheme. The quality may be predefined, or automatically set according to end user bandwidth, or in response to pre-designated publisher guidelines.

In a further embodiment, the encoding scheme comprises a proprietary codec such as WMV9®. The encoder module 406 then stores 812 the encoded streamlets 304 in the streamlet database 408. Once stored 812, the web server 116 may then serve 814 the streamlets 304. In one embodiment, serving 814 the streamlets 304 comprises receiving streamlet requests from the client module 114, retrieving the requested streamlet 304 from the streamlet database 408, and subsequently transmitting the streamlet 304 to the client module 114. The method 800 then ends 816.

Figure 9:
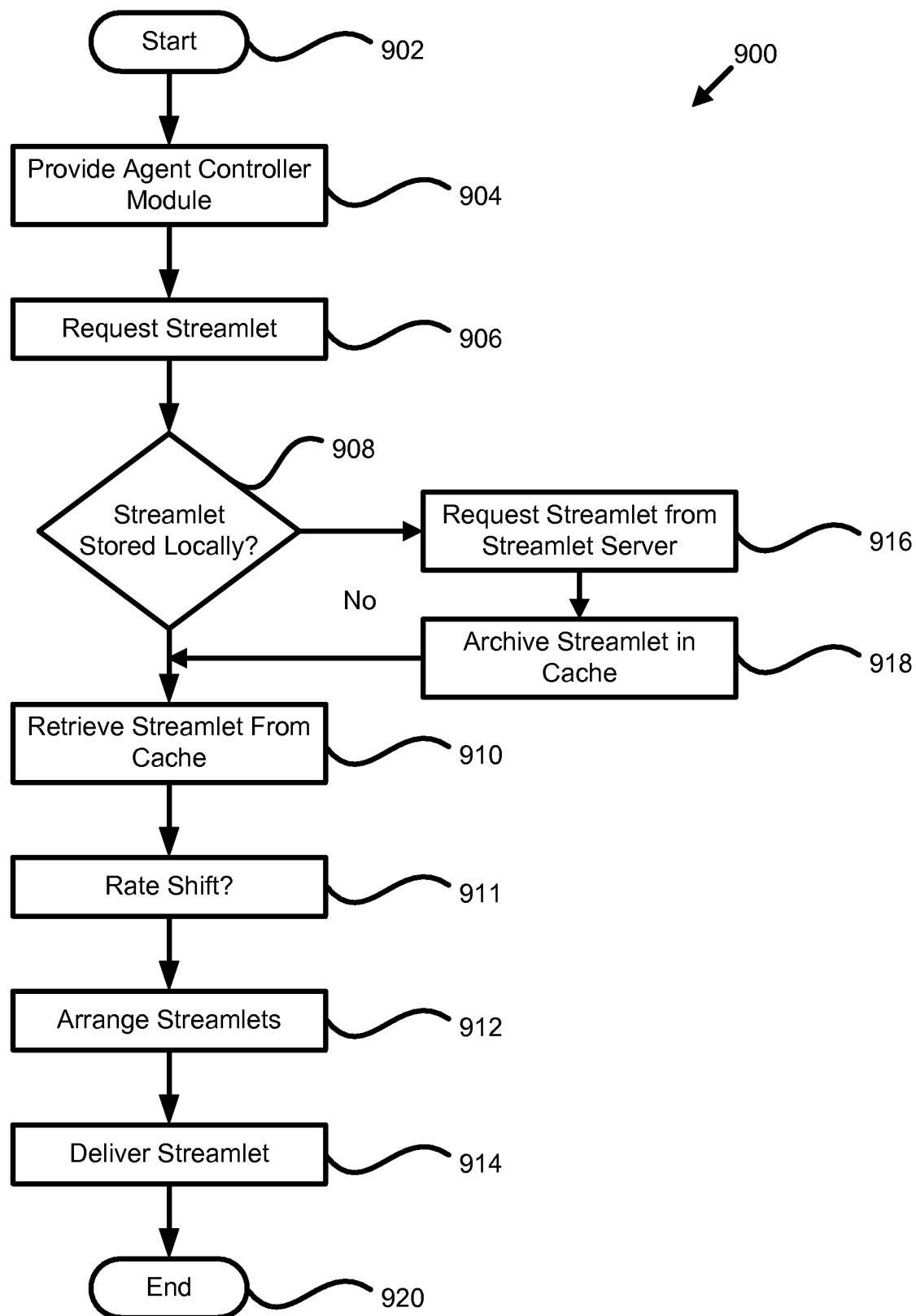
FIG. 9 is a schematic flow chart diagram illustrating one embodiment of a method for viewing a plurality of streamlets in accordance with the present invention.

FIG. 9 is a schematic flow chart diagram illustrating one embodiment of a method 900 for viewing a plurality of streamlets in accordance with the present invention. The method 900 starts and an agent control module 702 is provided 904 and associated with a viewer 708 and provided with a staging module 709. The agent controller module 702 then requests 906 a streamlet 304 from the streamlet cache module 704. Alternatively, the agent controller module 702 may simultaneously request 906 a plurality of streamlets 304 the streamlet cache module 704. If the streamlet is stored 908 locally in the streamlet cache 710, the streamlet cache module 704 retrieves 910 the streamlet 304 and sends the streamlet to the agent controller module 702. Upon retrieving 910 or receiving a streamlet, the agent controller module 702 makes 911 a determination of whether or not to shift to a higher or lower quality stream 202. This determination will be described below in greater detail with reference to FIG. 10.

In one embodiment, the staging module 709 then arranges 912 the streamlets 304 into the proper order, and the agent controller module 702 delivers 914 the streamlets to the viewer 708. In a further embodiment, delivering 914 streamlets 304 to the end user comprises playing video and or audio streamlets on the viewer 708. If the streamlets 304 are not stored 908 locally, the streamlet request is passed to the network controller module 706. The network controller module 706 then requests 916 the streamlet 304 from the web server 116. Once the streamlet 304 is received, the network controller module 706 passes the streamlet to the streamlet cache module 704. The streamlet cache module 704 archives 918 the streamlet. Alternatively, the streamlet cache module 704 then archives 918 the streamlet and passes the streamlet to the agent controller module 702, and the method 900 then continues from operation 910 as described above.

Figure 10:
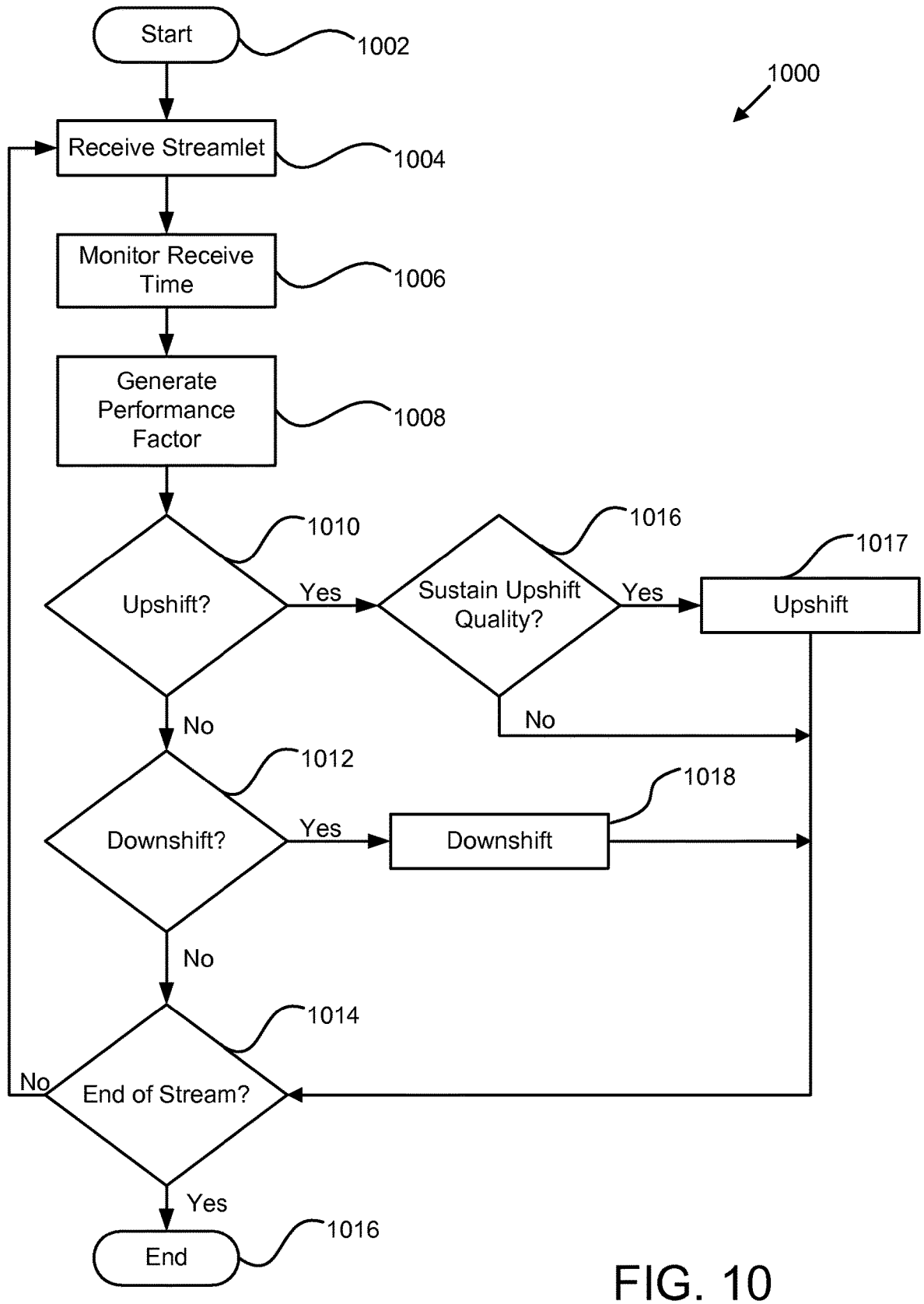
FIG. 10 is a schematic flow chart diagram illustrating one embodiment of a method for requesting streamlets within a adaptive-rate shifting content streaming environment in accordance with the present invention.

Referring now to FIG. 10, shown therein is a schematic flow chart diagram illustrating one embodiment of a method 1000 for requesting streamlets 304 within a adaptive-rate shifting content streaming environment in accordance with the present invention. The method 1000 may be used in one embodiment as the operation 911 of FIG. 9. The method 1000 starts and the agent controller module 702 receives 1004 a streamlet 304 as described above with reference to FIG. 9. The agent controller module 702 then monitors 1006 the receive time of the requested streamlet. In one embodiment, the agent controller module 702 monitors the time intervals Δ between successive receive times for each streamlet response. Ordering of the responses in relation to the order of their corresponding requests is not relevant.

Because network behavioral characteristics fluctuate, sometimes quite suddenly, any given Δ may vary substantially from another. In order to compensate for this fluctuation, the agent controller module 702 calculates 1008 a performance ratio r across a window of n samples for streamlets of playback length S. In one embodiment the performance ratio r is calculated using the equation $$r = S \frac{n}{\sum_{i=1}^{n} \Delta_i}.$$

Due to multiple simultaneous streamlet processing, and in order to better judge the central tendency of the performance ratio r, the agent controller module 702 may calculate a geometric mean, or alternatively an equivalent averaging algorithm, across a window of size m, and obtain a performance factor φ:

$$\varphi_{current} = \left( \prod_{j=1}^{m} r_j \right)^{\frac{1}{m}}$$

The policy determination about whether or not to upshift 1010 playback quality begins by comparing $\varphi_{current}$ with a trigger threshold $\Theta_{np}$. If $\varphi_{current} \geq \Theta_{np}$, then an up shift to the next higher quality stream may be considered 1016. In one embodiment, the trigger threshold $\Theta_{np}$ is determined by a combination of factors relating to the current read ahead margin (i.e. the amount of contiguously available streamlets that have been sequentially arranged by the staging module 709 for presentation at the current playback time index), and a minimum safety margin. In one embodiment, the minimum safety margin may be 24 seconds. The smaller the read ahead margin, the larger $\Theta_{np}$ is to discourage upshifting until a larger read ahead margin may be established to withstand network disruptions.

If the agent controller module 702 is able to sustain 1016 upshift quality, then the agent controller module 702 will upshift 1017 the quality and subsequently, request higher quality streams. The determination of whether use of the higher, quality stream is sustainable 1016 is made by comparing an estimate of the higher quality stream's performance factor, $\varphi_{higher}$, with $\Theta_{np}$. If $\varphi_{higher} \geq \Theta_{np}$ then use of the higher quality stream is considered sustainable. If the decision of whether or not the higher stream rate is sustainable 1016 is "no," the agent control module 402 will not attempt to upshift 1017 stream quality. If the end of the stream has been reached 1014, the method 1000 ends 1016.

If the decision on whether or not to attempt upshift 1010 is "no", a decision about whether or not to downshift 1012 is made. In one embodiment, a trigger threshold $\Theta_{down}$ is defined in a manner analogous to $\Theta_{up}$. If $\varphi_{current} > \Theta_{down}$ then the stream quality may be adequate, and the agent controller module 702 does not downshift 1018 stream quality. However, if $\varphi_{current} \leq \Theta_{down}$, the agent controller module 702 does downshift 1018 the stream quality. If the end of the stream has not been reached 1014; the agent controller module 702 begins to request and receive 1004 lower quality streamlets and the method 1000 starts again. Of course, the above described equations and algorithms are illustrative only, and may be replaced by alternative streamlet monitoring solutions.

Figure 11:
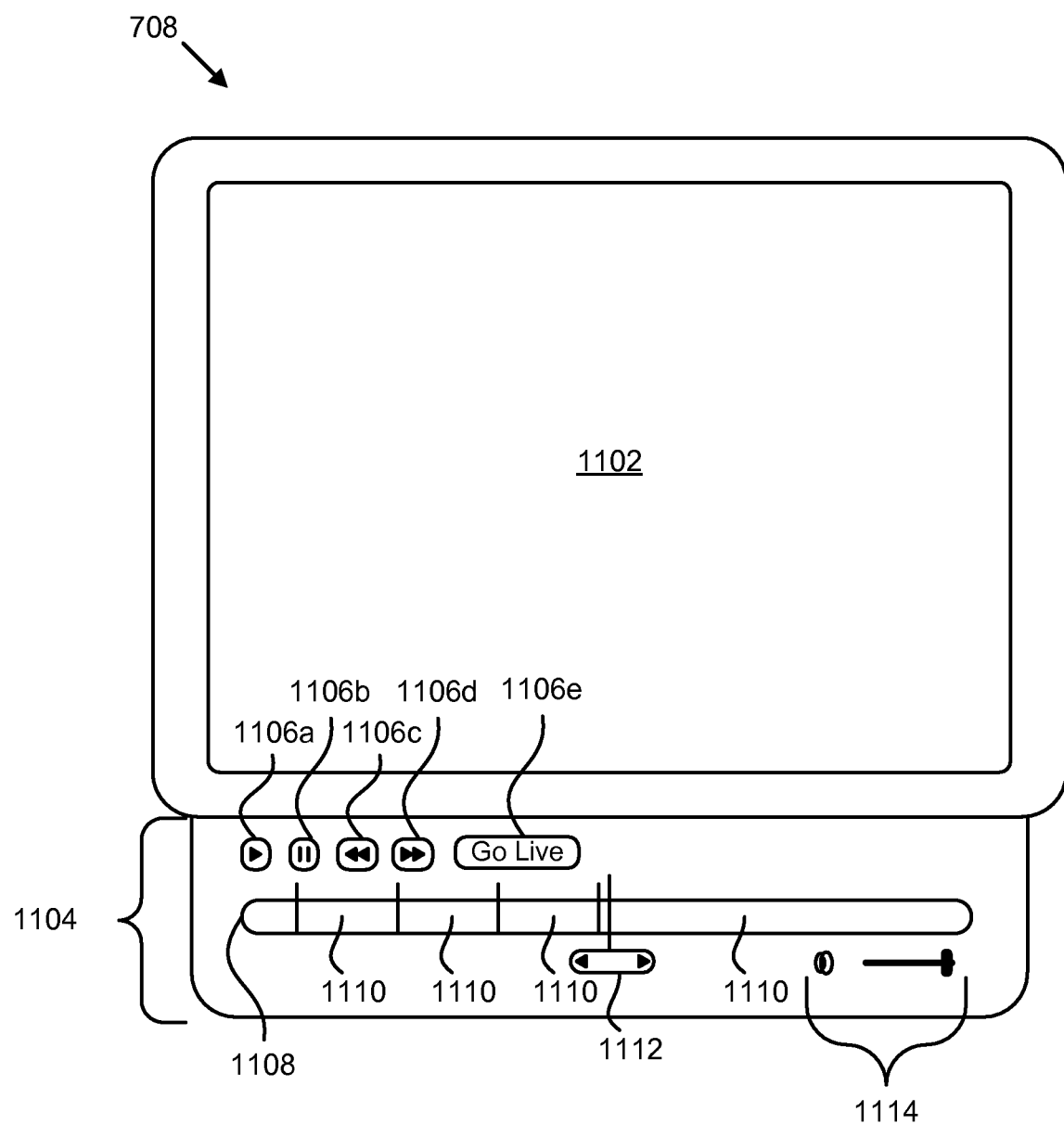
FIG. 11 is a schematic block diagram illustrating one embodiment of a viewer 708 in accordance with the present invention.

FIG. 11 is a schematic block diagram illustrating one embodiment of a viewer 708 in accordance with the present invention. The viewer 708, in one example, comprises software operating on a network or Internet 106 connected device. The FIG. 11 illustrates by way of example only, and one skilled in the art of software programming will recognize that the viewer 708 may be implemented utilizing many different styles and orientations. The depicted viewer 708 comprises a viewing area 1102 located above a control area 1104. The viewing area 1102 is configured to display the streamlets, and may be resized according a personal preference, or in order to accommodate various forms of audio/video.

The control area 1104, in one embodiment, includes buttons 1106 for controlling playback of content. The buttons may include, but are not limited to, play 1106a, pause 1106b, rewind 1106c, fast forward 1106d, and "go live" 1106e. The use of the independent encapsulated media streamlets allows the viewer 708 to fast forward through content without having to buffer the video. For example, if a person presses fast forward 1106d, the client module 114 (of FIG. 7) instead of sequentially requesting streamlets may begin to acquire every $10^{th}$ streamlet. In a further example, the client module 114 may only download and display "key frames" while in a fast forward mode. Different speeds of fast forward may be obtained by increasing from every $10^{th}$ streamlet to every $20^{th}$ streamlet, for example.

As described above with reference to FIG. 7, the client module 114 may be configured to cache displayed streamlets. Caching of the streamlets allows the client module 114 to "rewind" by simply retrieving the streamlet from a local cache. In the same manner described above, the client module 114 may display on the viewer every $10^{th}$ streamlet, for example. The "go live" button 1106e allows a person to synchronize the viewer 708 with the "live horizon." As used herein, the term "live horizon" refers to the newest streamlet. The "live horizon" will be discussed in greater detail below with reference to FIG. 14.

In a further embodiment, the viewer 708 further includes a timeline 1108 that is configured to represent the available content. The timeline 1108 is similar to a programming guide for a TV station. Portions 1110, as depicted, may correspond with different television shows. Bar 1112 indicates the current position relative to the content 1110. In one embodiment, the bar 1112 may be "dragged" to the right in order to fast forward through the content, and likewise to the left in order to rewind. The viewer 708 may also include volume controls 1114. The programs playing at selected times may also be listed on the timeline 1108.

Figure 12:
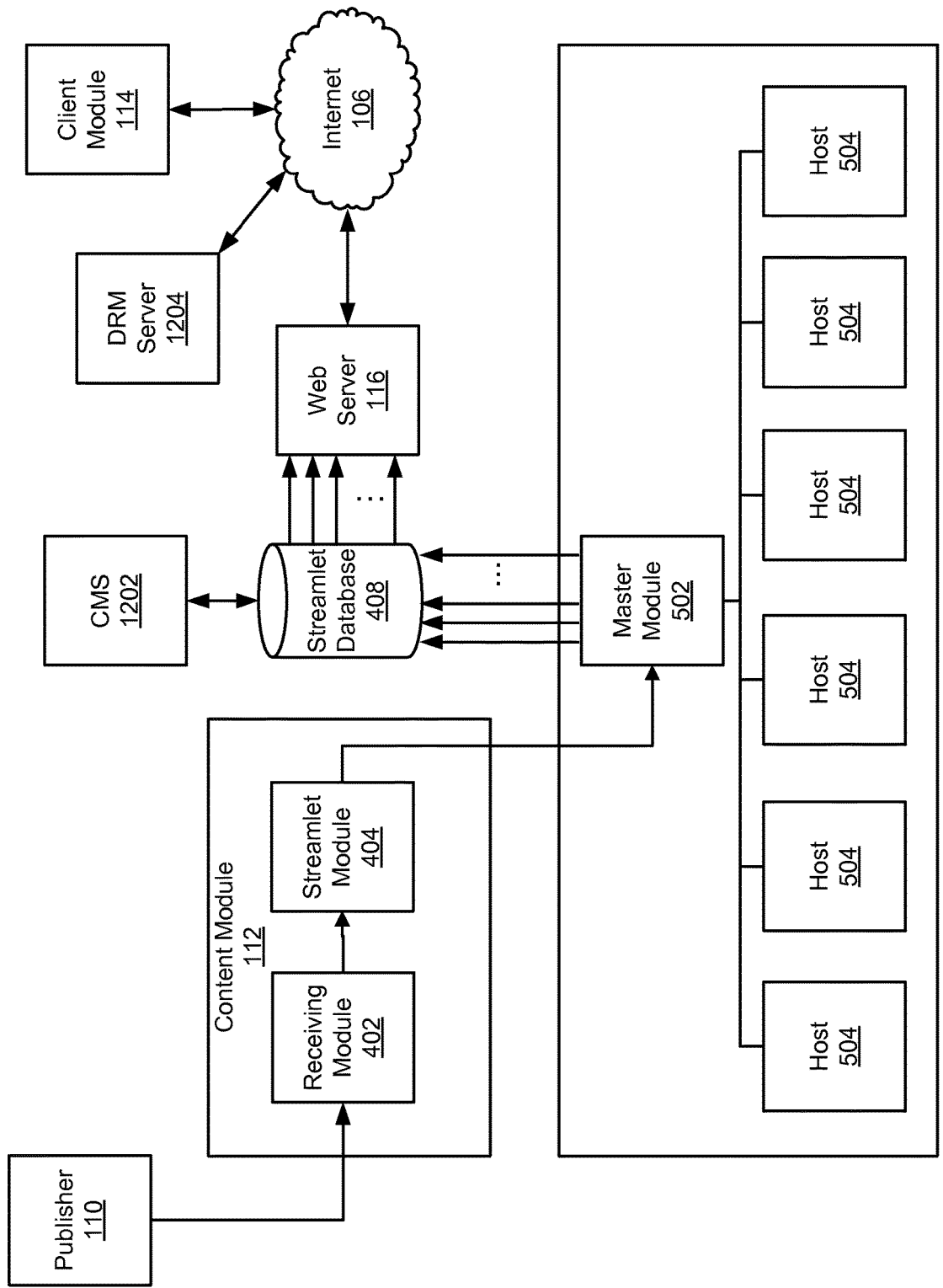
FIG. 12 is a schematic block diagram of a system for capturing, encoding; and distributing streamlets in accordance with the present invention.

FIG. 12 is a schematic block diagram of a system 1200 for capturing, encoding, and distributing streamlets in accordance with the present invention. The system 1200, as depicted, is similar to FIG. 5a described above and therefore, discussion of FIG. 12 will be limited to a content management system (CMS) 1202 and a digital rights management (DRM) server 1204.

The CMS 1202 is configured to manage content stored in the streamlet database 408. The CMS 1202, in one embodiment, provides a user interface for a person to build virtual timelines as described above. The CMS 1202 will be discussed in greater detail below with reference to FIG. 13. The DRM server 1204 is configured to provide digital rights management capability to the system 1200. The DRM sewer 1204 is further configured to supply encryption keys to the end user upon authenticating the end user.

In one embodiment, the DRM server 1204 is configured to authenticate a user based upon login credentials. One skilled in the art will recognize the various different ways the DRM server 1204 may authenticate an end user, including, but not limited to encrypted cookies, user profile, geolocation, source website, etc.

The DRM server 1204, in one embodiment, is configured to maintain keys used to decrypt content, and determine whether a client device is allowed to access content. Content may be encrypted when the content is processed by the encoder module 406, for example. The streamlets 304 of different bitrates may be encrypted with the same key. Alternatively, the encoder module 406 may be configured to encrypt each bit rate with a different set of encryption keys. This, beneficially, allows for a publisher to allow a "standard" user to view the movie at a lower resolution while a "premium" user is allowed to watch the movie at a higher resolution or bitrate. The DRM server 1204 is configured to authenticate a client device and accordingly communicate the appropriate decryption key.

In a further embodiment, the DRM server 1204 is configured to supply expiring encryption keys and/or rolling encryption keys. Both types of encryption keys enable a publisher, in the event that the encryption keys are compromised to update the encryption keys and continue to protect the content.

Figure 13:
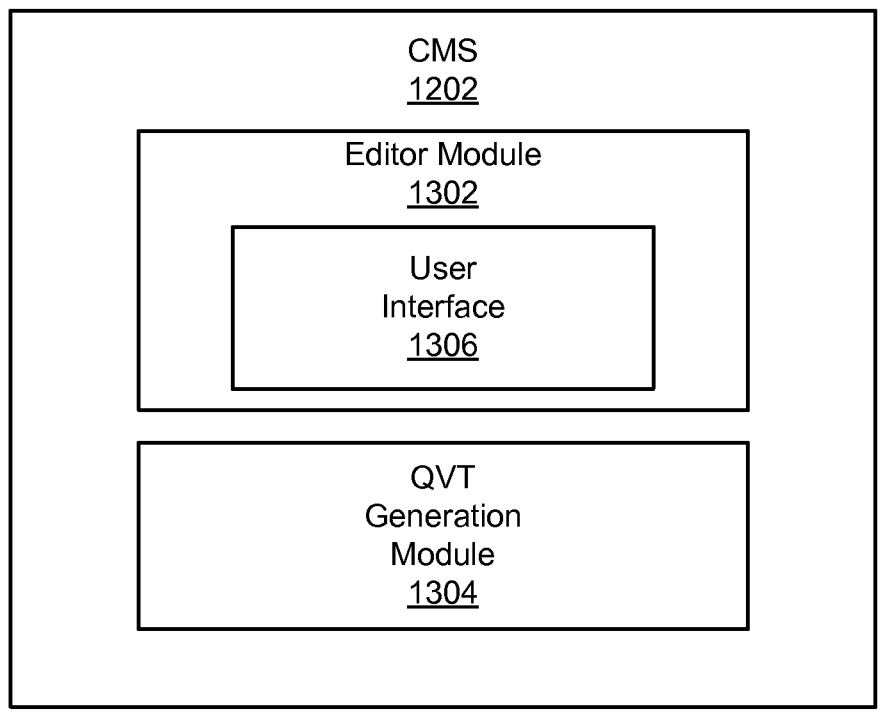
FIG. 13 is a schematic block diagram illustrating one embodiment of a content management system in accordance with the present invention.

FIG. 13 is a schematic block diagram illustrating one embodiment of a CMS 1202 in accordance with the present invention. The CMS 1202, in one embodiment, comprises an editor module 1302 and a QVT generation module 1304. The editor module 1302 is configured to enable a user or publisher to manage the content stored in the streamlet database 408. The editor module 1302 may comprise a user interface 1306 for displaying content. In a manner similar to current video editors, the user interface 1306 is configured to enable a user to "drag and drop" clips or entire programs into a timeline. The QVT generation module 1304 then generates a QVT as described above with reference to FIGS. 6a-6c.

In a further embodiment, the editor module 1302 may be configured to enable a user to "edit" a program. For example, a user may tag or label a program with various pieces of information, including, but not limited to, start and stop times, start and stop times of advertisements, time index of objectionable content, etc. These content labels may indicate scenes consisting of violence, sexual situations, indecent language, suggestive dialogue, fantasy violence, nudity, adult situations, and adult language. This data may be embedded in the streamlets or alternatively embedded in the QMX file of FIG. 6c or in the QVT file.

This beneficially enables the client module 114 to skip over content based upon a rating system. For example, a user may decide to watch a movie that is rated "R," but does not desire to hear vulgar language. The client module 114, after processing the QMX or QVT files, for example, can skip over vulgar scenes or simply mute the sound for a short period depending on the information embedded in the streamlets of the QMX or the information contained in the QVT.

Furthermore, the QVT generation module 1304 is configured to generate QVT files that contain information regarding live, non-live, or a mixture of both live and non-live content before the live content exists in the streamlet database. For example, a publisher may, on Monday, create a QVT for content that will be available on Thursday, including specifying that some of the content will be the live evening news even though the content has not been captured. The QVT generation module 1304 is configured to generate a QVT that includes the live program (in this example, the evening news). Additionally, if for some reason (broadcast outage) the live program or content is not available, the QVT generation module 1304 is configured to generate a QVT that includes alternative content.

As described above, the QVT may require that the client device periodically check for an updated QVT. If, for example, during the playback of the alternative content the live program (the evening news) becomes available, the QVT generation module 1304 is configured to generate a new QVT that indicates to the client device the availability of the live program, and users will begin watching the live program. Furthermore, the anchor module (of FIG. 6a) allows the client device to display content associated with the local time of the client device. Alternatively, people who were not watching a live stream of the content will eventually begin to watch the evening news from the beginning as if the broadcast outage did not occur.

Another feature enabled by this functionality is the possibility of content replacement. Content replacement, as used herein, refers to the ability to replace or augment a certain portion of the program. Content replacement will be described in greater detail below with reference to FIG. 14.

Figure 14:
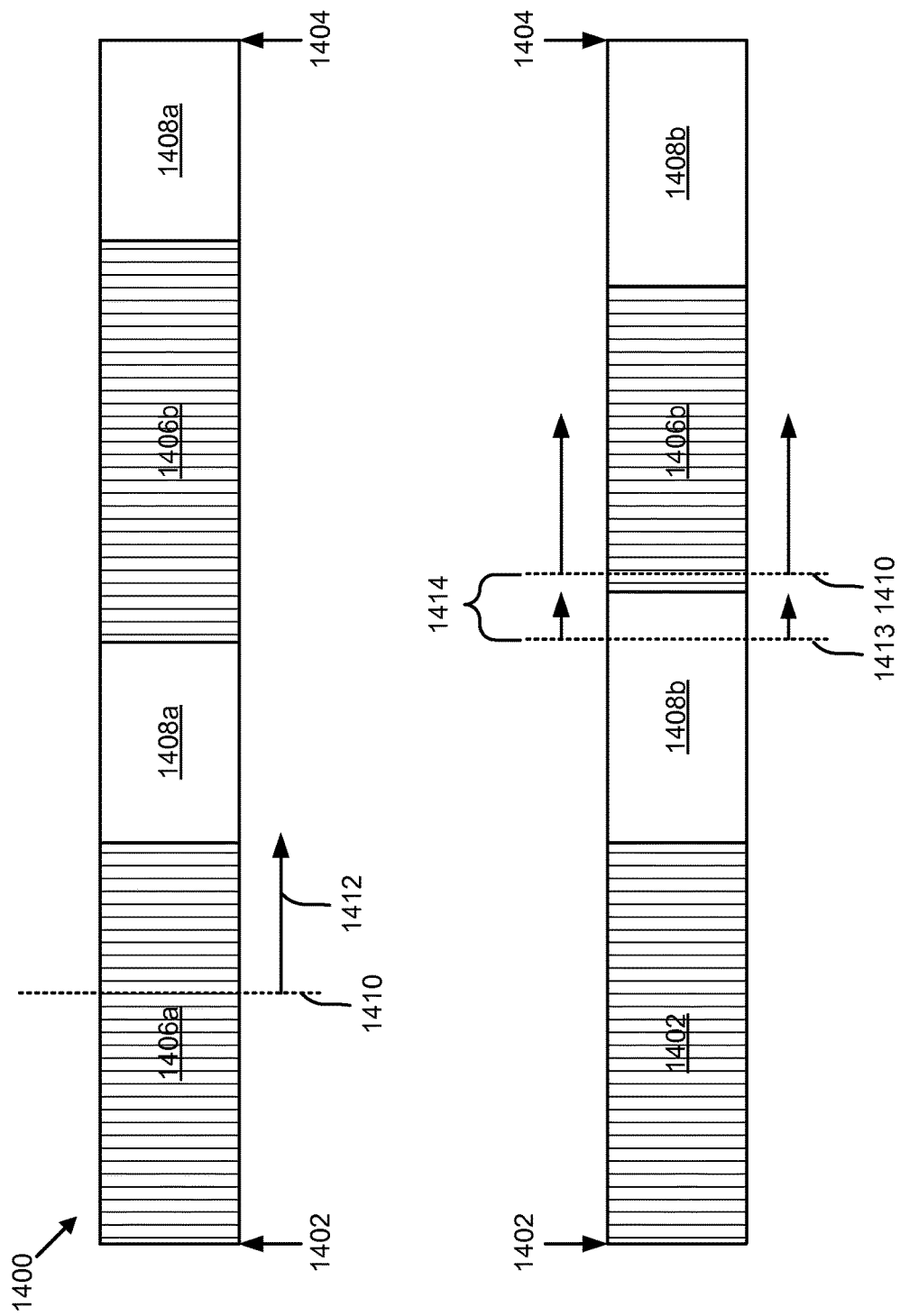
FIG. 14 is a schematic block diagram illustrating one embodiment of content management system for conducting content replacement in accordance with the present invention.

FIG. 14 is a schematic block diagram illustrating one embodiment of content replacement in accordance with the present invention. The depicted embodiment illustrates a representation of a program, for example a television show. The rectangular box 1400 represents the content of the program, having a start 1402 and an end 1404. The portion 1406 represents the actual television program separated by portions 1408 of advertisements. The dotted line 1410 represents the live horizon traveling in a direction indicated by arrows 1412 from the start 1402 of the program to the end of the program 1404.

As described above, the CMS 1202 is configured to augment or replace content such as the advertisements 1408. In one embodiment, the augmentation or replacement is accomplished by publishing a QVT directing the client module 114 to acquire the replacement advertisements 1408b. The replacement and augmentation of portions of the program is transparent to the end user and enables many different features including directed advertisements.

Directed advertisements may be dynamically selected based upon various factors including, but not limited to, the geo-location of the client module 114, the website the content is being viewed on, the user profile, browsing history of the user, buying history of the user, time, date, demographic, interests, etc. For example, assume a user wants to stream a program that is local to another part of the country. The advertisements displayed may not be relevant for the user because the advertisements are for local stores. The CMS 1202 is configured to dynamically replace the advertisements 1408a with advertisements 1408b that pertain to the location of the user.

In a further embodiment, the CMS 1202 is configured to augment certain portions of the program 1400. For example, during a television program the commercial break or advertisement portion 1408a may have a duration of two minutes in order to display four 30 second commercials. The CMS 1202 is further configured to augment the advertisements 1408a with longer commercials, or even extra commercials. The advertisement augmentation is transparent to the user. In this example, the live horizon 1410 will continue towards the end 1404 of the program 1402, but the location of the viewing horizon 1413 will trail the live horizon by the difference 1414 in time between the advertisements 1408a and 1408b.

The depicted embodiment of FIG. 14 illustrates dynamic content replacement within a program 1400 or single television show. However, dynamic content replacement may be implemented within a QVT that represents a day, week, month, etc. worth of programming. Furthermore, live and non-live content can be intermingled in the QVT. For example, advertisements during an online broadcast of a live football game could be replaced with selected, non-live advertisements. The user is then returned to viewing the live football game after viewing the non-live advertisements.

In another example, a publisher is able to create a QVT for any given day and have most of the content in the QVT be previously recorded shows, but select 10 am-noon and 5-7 pm as times when live segments should play. This beneficially allows a local TV affiliate, for example, to flexibly mix syndicated shows from parent network, locally produced pre-recorded content, locally-produced live programming; and syndicated live programming. Furthermore, this beneficially allows the publisher (in this example the local TV affiliate) to "mask" out live content that a publisher does not have rights to broadcast online. For example, a TV station may have online rights to play live some game shows but not a basketball game that falls between them, so the station would let the game shows play out live but replace the game with a movie.

Another feature enabled by content replacement is the ability of the CMS 1202 to determine if a user has fulfilled an advertisement viewing quota (as determined by a publisher) then the CMS 1202 may allow the user to "skip" a portion of advertisements. In one embodiment, the CMS 1202 may generate a QVT that allows the user to fast forward and rewind in a portion 1406a as he/she desires, but as soon as the viewing horizon 1412 passes from one portion 1406a into another portion 1406b advertisements 1408 must be displayed prior to watching the next portion 1406b.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for multi-bitrate content streaming, the apparatus comprising a programmable hardware device that comprises:
  a timeline module configured to receive and maintain a broadcaster defined programming lineup of media content available over a network, the media content comprising a plurality of streamlets representative of a portion of the media content;
  an anchor module, the anchor module configured to tie an actual point in real world time in a day that each of the plurality of streamlets of the media content in the programming lineup is available over the network; and
  a client module in communication with the anchor module to determine the actual point in real world time in the day that each of the plurality of streamlets is available over the network according to the broadcaster defined programming lineup, wherein the client module is further configured to request streamlets for playback of media content over the network during the actual points in real world time in the day that the streamlets are available.

2. The apparatus according to claim 1, wherein the client module is configured to edit content based upon an editing instruction in the timeline module associated with a time index of one of the plurality of streamlets.

3. The apparatus of claim 2, wherein the content editing comprises skipping a portion of the media content in response to a rating system.

4. The apparatus of claim 2, wherein the content editing comprises skipping one or more of the plurality of streamlets in response to a rating system.

5. The apparatus of claim 2, wherein the content editing comprises muting audio of one of the plurality of streamlets in response to a rating system.

6. The apparatus of claim 2, wherein the content editing comprises dynamically replacing at least one of the plurality of streamlets.

7. The apparatus of claim 6, wherein the replaced at least one of the plurality of streamlets is an advertisement.

8. The apparatus according to claim 1, wherein each streamlet comprises a portion of the media content encapsulated as an independent media object, and wherein each streamlet comprises a predetermined duration of time.

9. The apparatus of claim 1, wherein the timeline module, the anchor module and the client module comprise at least one programmable hardware device.

10. The apparatus of claim 1, further comprising a data module configured to maintain multi-bitrate streamlet information for the plurality of streamlets, wherein the client module configured to request streamlets for playback of media content based upon the multi-bitrate streamlet information.

11. The apparatus of claim 10, wherein the multi-bitrate streamlet information comprises at least one of a start time, an end time, a live video indicator, publisher data, an encryption level, a duration, and bitrate values.

12. The apparatus of claim 11, wherein the bitrate values comprise at least one of a frame size, audio channel data, codec data, a sample rate, and a frames parser.

13. A method for multi-bitrate content streaming, the method comprising:
  receiving and maintaining a broadcaster defined programming lineup of media content available over a network, the media content comprising a plurality of streamlets representative of a portion of the media content;

anchoring an actual point in real world time in a day that each of the plurality of streamlets of the media content in the programming lineup is available over the network; and requesting streamlets for playback of media content during the anchored actual points in real world time in the day that each of the plurality of streamlets is available over the network according to the broadcaster defined programming lineup.

14. The method according to claim 13, wherein each streamlet comprises a portion of the media content encapsulated as an independent media object, and wherein each streamlet comprises a predetermined duration of time.

15. The method according to claim 13, further comprising editing the media content based upon an editing instruction in a timeline module associated with a time index of one of the plurality of streamlets.

16. The method according to claim 15, wherein the editing the media content comprises skipping a portion of the media content in response to a rating system.

17. The method according to claim 15, wherein the editing the media content comprises muting audio of one of the plurality of streamlets in response to a rating system.

18. The method according to claim 15, wherein the editing the media content comprises dynamically replacing at least one of the plurality of streamlets.

19. The method according to claim 18, wherein the replaced at least one of the plurality of streamlets is an advertisement.

20. The method according to claim 13, further comprising maintaining multi-bitrate streamlet information for the plurality of streamlets, wherein the requesting streamlets for playback of media content further comprises requesting streamlets for playback of media content based upon the multi-bitrate streamlet information, wherein the multi-bitrate streamlet information comprises at least one of a start time, an end time, a live video indicator, publisher data, an encryption level, a duration, and bitrate values, and wherein the bitrate values comprise at least one of a frame size, audio channel data, codec data, a sample rate, and a frames parser.

* * * * *